United States Patent
Gunnam

(10) Patent No.: US 10,445,251 B2
(45) Date of Patent: *Oct. 15, 2019

(54) WEAR LEVELING IN NON-VOLATILE MEMORIES

(71) Applicant: Western Digital Technologies, Inc., San Jose, CA (US)

(72) Inventor: Kiran Kumar Gunnam, Milpitas, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 15/627,135

(22) Filed: Jun. 19, 2017

(65) Prior Publication Data
US 2017/0293569 A1 Oct. 12, 2017

Related U.S. Application Data

(63) Continuation-in-part of application No. 15/449,612, filed on Mar. 3, 2017, and a continuation-in-part of
(Continued)

(51) Int. Cl.
*G06F 12/10* (2016.01)
*G06F 12/02* (2006.01)
(Continued)

(52) U.S. Cl.
CPC ......... *G06F 12/1072* (2013.01); *G06F 7/768* (2013.01); *G06F 12/0246* (2013.01);
(Continued)

(58) Field of Classification Search
CPC .. G06F 12/1072; G06F 7/768; G06F 12/0246; G06F 2212/1016;
(Continued)

(56) References Cited

U.S. PATENT DOCUMENTS 5,838,893 A 11/1998 Douceur
5,937,435 A 8/1999 Dobbek et al.
(Continued)

FOREIGN PATENT DOCUMENTS

CN 103546397 A 1/2014
CN 104731713 A 6/2015

OTHER PUBLICATIONS

Yun et al, "Dynamic Wear Leveling for Phase-Change Memories With Endurance Variations"; IEEE Transactions on Very Large Scale Integration (VLSI) Systems; vol. 23, Issue 9; Sep. 2014; pp. 1604-1615; doi 10.1109/TVLSI.2014.2350073; http://ieeexplore.ieee.org/xpl/articleDetails.jsp?arnumber=6893041.
(Continued)

*Primary Examiner* — Masud K Khan
(74) *Attorney, Agent, or Firm* — Loza & Loza, LLP; Gabriel Fitch

(57) ABSTRACT

Systems and methods for wear leveling in non-volatile memories (NVMs) are illustrated. One such system includes a first non-volatile memory configured to store information from a host, a second non-volatile memory storing a plurality of cumulative control states, each indicative of a state of random mappings between physical block addresses (PBAs) and logical block addresses (LBAs) of the first non-volatile memory, and a plurality of control states, an access network configured to translate LBAs to PBAs based on the plurality of cumulative control states, a background swap scheduler configured to swap PBAs assigned to LBAs based on the plurality of control states, and a controller configured to sequentially advance through the plurality of cumulative control states and the plurality of control states.

26 Claims, 30 Drawing Sheets

Related U.S. Application Data application No. 14/967,169, filed on Dec. 11, 2015, now Pat. No. 9,921,969.

(60) Provisional application No. 62/360,916, filed on Jul. 11, 2016, provisional application No. 62/192,509, filed on Jul. 14, 2015.

(51) Int. Cl.
*G06F 7/76* (2006.01)
*G06F 12/06* (2006.01)
*G06F 12/1072* (2016.01)

(52) U.S. Cl.
CPC .. *G06F 12/0607* (2013.01); *G06F 2212/1044* (2013.01); *G06F 2212/152* (2013.01); *G06F 2212/7201* (2013.01); *G06F 2212/7211* (2013.01)

(58) Field of Classification Search
CPC ....... G06F 2212/1044; G06F 2212/152; G06F 2212/7201; G06F 2212/7211
See application file for complete search history.

(56) References Cited

U.S. PATENT DOCUMENTS

| | | | |
|---|---|---|---|
| 5,943,283 A | 8/1999 | Wong et al. | |
| 6,345,001 B1 | 2/2002 | Mokhlesi | |
| 6,430,672 B1 | 8/2002 | Dhong et al. | |
| 6,850,443 B2 | 2/2005 | Lofgren et al. | |
| 7,711,923 B2 | 5/2010 | Rogers et al. | |
| 7,911,364 B1 | 3/2011 | Zhang et al. | |
| 8,266,367 B2 | 9/2012 | Yu et al. | |
| 8,341,332 B2 | 12/2012 | Ma et al. | |
| 8,375,160 B2 | 2/2013 | Nakanishi et al. | |
| 8,522,072 B2 | 8/2013 | Huang | |
| 8,660,608 B2 | 2/2014 | Schell et al. | |
| 8,667,248 B1 | 3/2014 | Neppalli | |
| 8,719,489 B2 | 5/2014 | Tzeng | |
| 8,745,357 B2 | 6/2014 | Tucek et al. | |
| 8,782,320 B2 | 7/2014 | Gunnam | |
| 8,806,171 B2 | 8/2014 | Seong et al. | |
| 8,862,810 B2 | 10/2014 | Lee et al. | |
| 8,977,894 B2 | 3/2015 | Eleftheriou et al. | |
| 9,104,555 B2 | 8/2015 | Liebowitz et al. | |
| 9,158,672 B1 | 10/2015 | Zheng et al. | |
| 9,170,933 B2 | 10/2015 | Cideciyan et al. | |
| 9,189,420 B2 | 11/2015 | Yu et al. | |
| 9,268,686 B2 | 2/2016 | Linkewitsch | |
| 2005/0172065 A1* | 8/2005 | Keays | G06F 11/1068 711/103 |
| 2005/0188149 A1* | 8/2005 | Kaler | G06F 11/1441 711/103 |
| 2005/0258863 A1 | 11/2005 | Chang et al. | |
| 2006/0282610 A1 | 12/2006 | Dariel et al. | |
| 2007/0208904 A1 | 9/2007 | Hsieh et al. | |
| 2007/0255889 A1* | 11/2007 | Yogev | G06F 12/0246 711/103 |
| 2007/0294490 A1 | 12/2007 | Freitas et al. | |
| 2009/0327602 A1 | 12/2009 | Moore et al. | |
| 2010/0070735 A1 | 3/2010 | Chen et al. | |
| 2010/0088461 A1 | 4/2010 | Yang et al. | |
| 2010/0115175 A9 | 5/2010 | Zhuang et al. | |
| 2010/0125696 A1 | 5/2010 | Kumar et al. | |
| 2012/0099670 A1 | 4/2012 | Gunnam | |
| 2012/0233381 A1 | 9/2012 | Tucek et al. | |
| 2013/0007380 A1* | 1/2013 | Seekins | G06F 3/0616 711/154 |
| 2013/0166827 A1 | 6/2013 | Cideciyan et al. | |
| 2014/0052899 A1 | 2/2014 | Nan | |
| 2014/0189284 A1 | 7/2014 | Hyuseinova et al. | |
| 2014/0237160 A1 | 8/2014 | Dong | |
| 2014/0337564 A1 | 11/2014 | Varanasi | |
| 2015/0012694 A1 | 1/2015 | Edelhaeuser | |
| 2015/0134930 A1 | 5/2015 | Huang et al. | |
| 2016/0246712 A1 | 8/2016 | Vucinic et al. | |
| 2016/0283549 A1 | 9/2016 | Hux | |

OTHER PUBLICATIONS

Chen et al, "Energy and Memory Efficient Mapping of Bitonic Sorting on FPGA"; FPGA '15 Proceedings of the 2015 AC/SIGDA Intl Symposium on Field-Programmable Gate Arrays; 2015; pp. 240-259; ISBN 978-1-4503-3315-3; doi 10.1145/2684746. 2689068; http://dl.acm.org/citation.cfm?id=2689068.

HGST, Inc. "FlashMAX PCIe" Data Sheet; https://www.hgst.com/sites/default/files/resources/FlashMAX-PCIe-SSD-DS.pdf; 2015; 2 pages.

Teshome et al., "A Tri-Pool Dynamic Wear-Leveling Algorithm for Large Scale Flash Memory Storage Systems", http://ieeexplore.ieee.org/xpl/login.jsp?tp=&arnumber=5772379; downloaded May 19, 2015; 2 pages.

Xinhua et al, "A Wear-Leveling Algorithm for Nandflash in Embedded System" abstract, Embedded Computing, 2008, SEC '08. Fifth IEEE Intl Symposium on, Beijing, pp. 260-265, doi 10.1109/SEC. 2008.54; http://ieeexplore.ieee.org/stamp/stamp.jsp?tp=&arnumber=4690759&isnumber=4690708.

\* cited by examiner

*2300*

Example: Global Mapping
with Bit Inverse of MSB 1 (0001) → 9 (1001)
2 (0010) → 10 (1010)
3 (0011) → 11 (1011)
4 (0100) → 12 (1100)
5 (0101) → 13 (1101)
6 (0110) → 14 (1110)
7 (0111) → 15 (1111)
8 (1000) → 16 (0000)
9 (1001) → 1 (0001)
10 (1010) → 2 (0010)
11 (1011) → 3 (0011)
12 (1100) → 4 (0100)
13 (1101) → 5 (0101)
14 (1110) → 6 (0110)
15 (1111) → 7 (0111)
16 (0000) → 8 (1000)

*FIG. 23*

Example: Local Interleaving with Permutation
[x2 x1 x0] → [x2 x0 x1]

0 (000) ⟶ 0 (000)
1 (001) ⟶ 2 (010)
2 (010) ⟶ 1 (001)
3 (011) ⟶ 3 (011)
4 (100) ⟶ 4 (100)
5 (101) ⟶ 6 (110)
6 (110) ⟶ 5 (101)
7 (111) ⟶ 7 (111)

| Original | Global Only | Global + Local |
|---|---|---|
| 1 | 9 | 9 |
| 2 | 10 | 11 |
| 3 | 11 | 10 |
| 4 | 12 | 12 |
| 5 | 13 | 13 |
| 6 | 14 | 14 |
| 7 | 15 | 15 |
| 8 | 16 | 16 |
| 9 | 1 | 1 |
| 10 | 2 | 3 |
| 11 | 3 | 2 |
| 12 | 4 | 4 |
| 13 | 5 | 5 |
| 14 | 6 | 7 |
| 15 | 7 | 6 |
| 16 | 8 | 8 |

*FIG. 25*

WEAR LEVELING IN NON-VOLATILE MEMORIES

CROSS-REFERENCE TO RELATED APPLICATION(S)

This application is a continuation in part of U.S. patent application Ser. No. 15/449,612, filed on Mar. 3, 2017, and entitled, "ACCESS NETWORK FOR ADDRESS MAPPING IN NON-VOLATILE MEMORIES", which claims priority to and the benefit of U.S. Provisional Application No. 62/360,916, filed on Jul. 11, 2016, and entitled, "GENERATION OF RANDOM ADDRESS MAPPING IN NON-VOLATILE MEMORIES USING LOCAL AND GLOBAL INTERLEAVING", and is a continuation in part of U.S. patent application Ser. No. 14/967,169, filed on Dec. 11, 2015, and entitled, "GENERATION OF RANDOM ADDRESS MAPPING IN NON-VOLATILE MEMORIES USING LOCAL AND GLOBAL INTERLEAVING", which claims priority to and the benefit of U.S. Provisional Application No. 62/192,509, filed on Jul. 14, 2015, and entitled, "SYSTEMS AND METHODS FOR PROVIDING DYNAMIC WEAR LEVELING IN NON-VOLATILE MEMORIES", the entire content of each application referenced above is incorporated herein by reference.

FIELD

Aspects of the disclosure relate generally to wear leveling, and more specifically, to wear leveling in non-volatile memories.

BACKGROUND

In a variety of consumer electronics, solid state drives incorporating non-volatile memories (NVMs) are frequently replacing or supplementing conventional rotating hard disk drives for mass storage. These non-volatile memories may include one or more flash memory devices, the flash memory devices may be logically divided into blocks, and each of the blocks may be further logically divided into addressable pages. These addressable pages may be any of a variety of sizes (e.g., 512 Bytes, 1 Kilobytes, 2 Kilobytes, 4 Kilobytes), which may or may not match the logical block address sizes used by a host computing device.

During a write operation, data may be written to the individual addressable pages in a block of a flash memory device. However, in order to erase or rewrite a page, an entire block must typically be erased. Of course, different blocks in each flash memory device may be erased more or less frequently depending upon the data stored therein. Thus, since the lifetime of storage cells of a flash memory device correlates with the number of erase cycles, many solid state drives perform wear-leveling operations (both static and dynamic) in order to spread erasures more evenly over all of the blocks of a flash memory device.

To make sure that all of the physical pages in a NVM (e.g., flash memory device) are used uniformly, the usual practice is to maintain a table for the frequency of use for all of the logical pages and periodically map the most frequently accessed logical address to physical lines. However, these table indirection based methods incur significant overhead in table size. For instance to use a table approach for a 2 terabyte (TB) storage device with 512 byte pages, a 137 gigabyte (GB) table would be needed. This is clearly not practical.

SUMMARY

In one aspect, the disclosure provides a non-volatile memory system configured for wear leveling, the system comprising a first non-volatile memory configured to store information from a host, a second non-volatile memory storing a plurality of cumulative control states, each indicative of a state of random mappings between physical block addresses (PBAs) and logical block addresses (LBAs) of the first non-volatile memory, and a plurality of control states, an access network configured to translate LBAs to PBAs based on the plurality of cumulative control states, a background swap scheduler configured to swap PBAs assigned to LBAs based on the plurality of control states, and a controller configured to sequentially advance through the plurality of cumulative control states and the plurality of control states.

In another aspect, the disclosure provides a method for wear leveling in a non-volatile memory system, the method comprising storing information in a first non-volatile memory, storing a plurality of cumulative control states, each indicative of a state of random mappings between physical block addresses (PBAs) and logical block addresses (LBAs) of the first non-volatile memory, and a plurality of control states in a second non-volatile memory, translating LBAs to PBAs based on the plurality of cumulative control states, swapping PBAs assigned to LBAs based on the plurality of control states, and advancing sequentially through the plurality of cumulative control states and the plurality of control states.

In another aspect, the disclosure provides a non-volatile memory system configured for wear leveling, the system comprising means for storing information in a first non-volatile memory, means for storing a plurality of cumulative control states, each indicative of a state of random mappings between physical block addresses (PBAs) and logical block addresses (LBAs) of the first non-volatile memory, and a plurality of control states in a second non-volatile memory, means for translating LBAs to PBAs based on the plurality of cumulative control states, means for swapping PBAs assigned to LBAs based on the plurality of control states, and means for advancing sequentially through the plurality of cumulative control states and the plurality of control states.

BRIEF DESCRIPTION OF THE DRAWINGS

FIG. 23 is a table illustrating a numerical example of global mapping using bit inverse on G bits in accordance with one embodiment of the disclosure.

FIG. 25 is a table illustrating a numerical example of global mapping using bit inverse and local interleaving using permutation in accordance with one embodiment of the disclosure.

DETAILED DESCRIPTION

Figure 1:
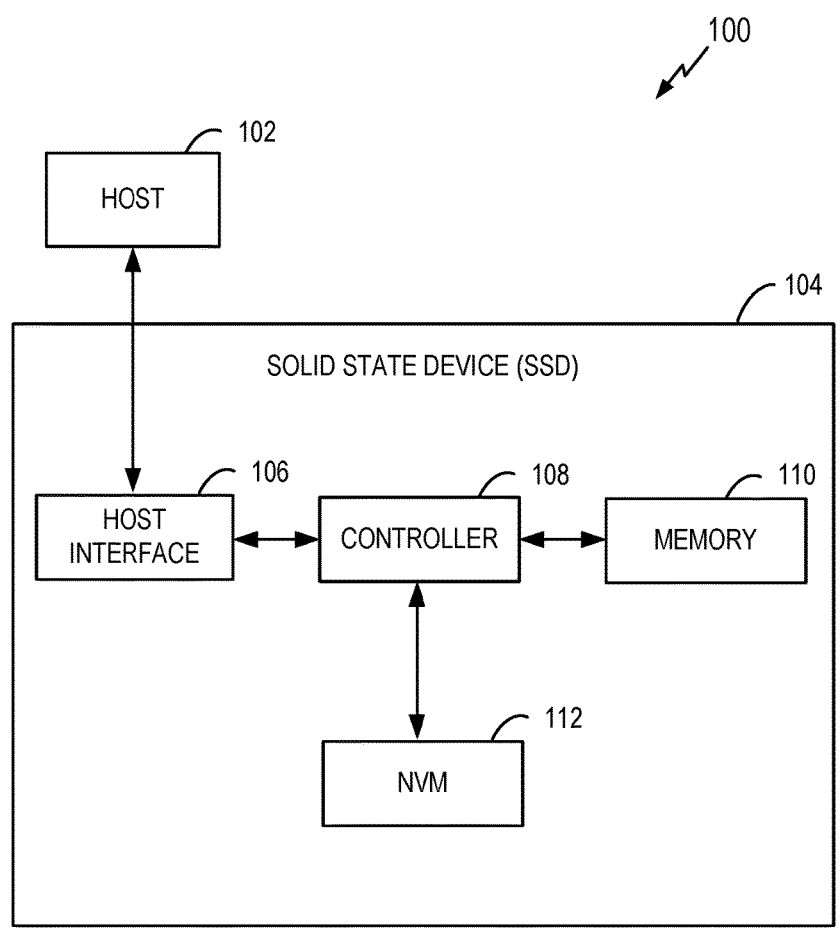
FIG. 1 is a block diagram of a solid state device (SSD) that can perform local address mapping in accordance with one embodiment of the disclosure.

Referring now to the drawings, systems and methods for wear leveling in non-volatile memories (NVMs) are illustrated. One such system includes a first non-volatile memory configured to store information from a host, a second non-volatile memory storing a plurality of cumulative control states, each indicative of a state of random mappings between physical block addresses (PBAs) and logical block addresses (LBAs) of the first non-volatile memory, and a plurality of control states, an access network configured to translate LBAs to PBAs based on the plurality of cumulative control states, a background swap scheduler configured to swap PBAs assigned to LBAs based on the plurality of control states, and a controller configured to sequentially advance through the plurality of cumulative control states and the plurality of control states. One such method includes storing information in a first non-volatile memory, storing a plurality of cumulative control states, each indicative of a state of random mappings between physical block addresses (PBAs) and logical block addresses (LBAs) of the first non-volatile memory, and a plurality of control states in a second non-volatile memory, translating LBAs to PBAs based on the plurality of cumulative control states, swapping PBAs assigned to LBAs based on the plurality of control states, and advancing sequentially through the plurality of cumulative control states and the plurality of control states.

One example method involves randomly generating first switch settings, receiving a first randomly ordered list and the first switch settings, generating a permutation of the first randomly ordered list using the first switch settings, where the permutation comprises a second randomly ordered list, sorting the second randomly ordered list using a bitonic sort, determining settings of second switches used to achieve the bitonic sort, where the second switch settings define a cumulative control state, and determining a PBA of a non-volatile memory (NVM) to enable a data access of a corresponding LBA using the cumulative control state.

Embodiments of these mapping systems and the corresponding methods may involve substantially less hardware, and more specifically, less storage to manage mapping LBAs to PBAs than say the indirection tables discussed above. Moreover, these mapping systems and methods may work well in conjunction with random address mapping in non-volatile memories using local and global interleaving as are illustrated in FIGS. 20-30 and discussed in detail below.

FIG. 1 is a block diagram of a solid state device (SSD) that can perform local address mapping in accordance with one embodiment of the disclosure. The system 100 includes a host 102 and a SSD storage device 104 coupled to the host 102. The host 102 provides commands to the SSD storage device 104 for transferring data between the host 102 and the SSD storage device 104. For example, the host 102 may provide a write command to the SSD storage device 104 for writing data to the SSD storage device 104 or read command to the SSD storage device 104 for reading data from the SSD storage device 104. The host 102 may be any system or device having a need for data storage or retrieval and a compatible interface for communicating with the SSD storage device 104. For example, the host 102 may a computing device, a personal computer, a portable computer, or workstation, a server, a personal digital assistant, a digital camera, a digital phone, or the like.

The SSD storage device 104 includes a host interface 106, a controller 108, a memory 110, and a non-volatile memory 112. The host interface 106 is coupled to the controller 108 and facilitates communication between the host 102 and the controller 108. Additionally, the controller 108 is coupled to the memory 110 and the non-volatile memory 112. The host interface 106 may be any type of communication interface, such as an Integrated Drive Electronics (IDE) interface, a Universal Serial Bus (USB) interface, a Serial Peripheral (SP) interface, an Advanced Technology Attachment (ATA) interface, a Small Computer System Interface (SCSI), an IEEE 1394 (Firewire) interface, or the like. In some embodiments, the host 102 includes the SSD storage device 104. In other embodiments, the SSD storage device 104 is remote with respect to the host 102 or is contained in a remote computing system coupled in communication with the host 102. For example, the host 102 may communicate with the SSD storage device 104 through a wireless communication link.

The controller 108 controls operation of the SSD storage device 104. In various embodiments, the controller 108 receives commands from the host 102 through the host interface 106 and performs the commands to transfer data between the host 102 and the non-volatile memory 112. The controller 108 may include any type of processing device, such as a microprocessor, a microcontroller, an embedded controller, a logic circuit, software, firmware, or the like, for controlling operation of the SSD storage device 104.

In some embodiments, some or all of the functions described herein as being performed by the controller 108 may instead be performed by another element of the SSD storage device 104. For example, the SSD storage device 104 may include a microprocessor, a microcontroller, an embedded controller, a logic circuit, software, firmware, or any kind of processing device, for performing one or more of the functions described herein as being performed by the controller 108. In some embodiments, one or more of the functions described herein as being performed by the controller 108 are instead performed by the host 102. In some embodiments, some or all of the functions described herein as being performed by the controller 108 may instead be performed by another element such as a controller in a hybrid drive including both non-volatile memory elements and magnetic storage elements.

The memory 110 may be any memory, computing device, or system capable of storing data. For example, the memory 110 may be a random-access memory (RAM), a dynamic random-access memory (DRAM), a static random-access memory (SRAM), a synchronous dynamic random-access memory (SDRAM), a flash storage, an erasable programmable read-only-memory (EPROM), an electrically erasable programmable read-only-memory (EEPROM), or the like. In various embodiments, the controller 108 uses the memory 110, or a portion thereof, to store data during the transfer of data between the host 102 and the non-volatile memory 112. For example, the memory 110 or a portion of the memory 110 may be a cache memory.

The non-volatile memory (NVM) 112 receives data from the controller 108 and stores the data. The non-volatile memory 112 may be any type of non-volatile memory, such as a flash storage system, a solid state drive, a flash memory card, a secure digital (SD) card, a universal serial bus (USB) memory device, a CompactFlash card, a SmartMedia device, a flash storage array, or the like.

The controller 108 or NVM 112 can be configured to perform any of the local address mapping schemes described herein.

One way to address the large indirection table issue discussed in the background section above for page based NVMs is to improve the process of mapping logical pages to physical pages, and more specifically, the process for mapping logical block addresses (LBAs) to physical block addresses (PBAs).

Local Address Mapping for Wear Leveling

Figure 2:
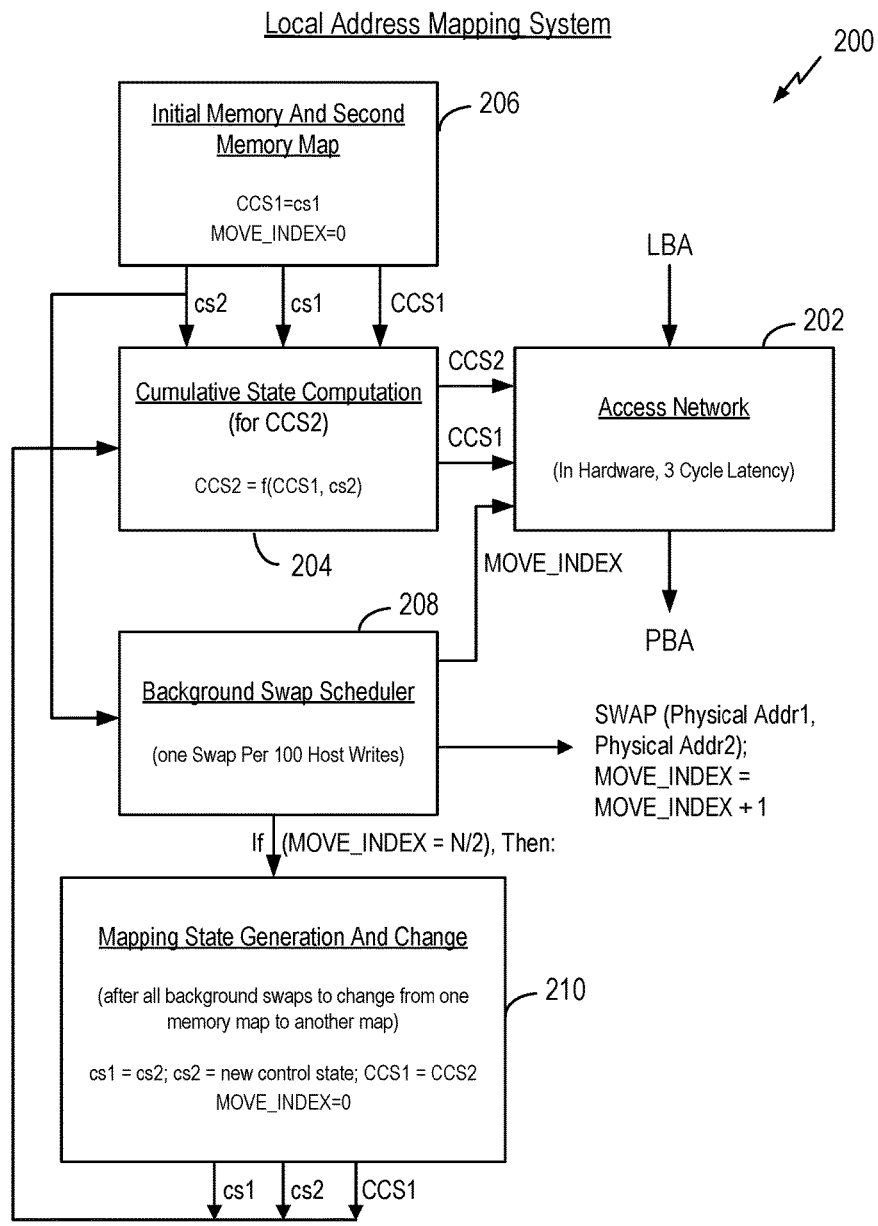
FIG. 2 is a block diagram of a system for performing local address mapping including an access network and a cumulative state computation block that can be used to map logical block addresses (LBAs) to physical block addresses (PBAs) in accordance with one embodiment of the disclosure.

FIG. 2 is a block diagram of a system 200 for performing local address mapping including an access network 202 and a cumulative state computation block 204 that can be used to map logical block addresses (LBAs) to a physical block addresses (PBAs) in accordance with one embodiment of the disclosure. The system 200 further includes an initial and second memory map block 206, a background swap scheduler 208, and a mapping state generation and change block 210. In one aspect, the access network 202 can be implemented in hardware (e.g., ultra-low latency with 3 cycle pipeline delay with low logic and memory equivalent of less than 10,000 logic gates) and the remaining components of the system 200 can be implemented in firmware and/or software.

The access network 202, which will be discussed in greater detail below, receives the latest two cumulative control states in CCS1 and CCS2 from the cumulative control state block 204 along with a move index from the background swap scheduler 208. Using these inputs, the access network 202 can determine which physical block address (PBA) a given logical block address (LBA) is mapped to using two slave networks (e.g., bitonic or Benes networks) that each receive one of the two cumulative control states to generate a possible mapping.

The cumulative state computation block 204 (e.g., cumulative control state determiner), which will be discussed in greater detail below, initially receives control states in cs1 and cs2 and CCS1 from the initial and second memory map block 206. In one aspect, the initial control states may have random values and CCS1 may be set to cs1. After an initial period, the cumulative state computation block 204 may receive these inputs from the mapping state generation change block 210. Using these inputs, the cumulative state computation block 204 can determine a second cumulative control state, CCS2, which is a function of CCS1 and cs2. The control states, cs1 and cs2, can be used as inputs to a master bitonic network, or another suitable network, and ultimately to determine the second cumulative control state, CCS2. The cumulative control states, CCS1 and CCS2, can be used by the access network 202 to determine current LBA to PBA mappings. In one aspect, the cumulative state may be computed in firmware using the master bitonic network when the system changes the mapping periodically once the system completes all the transfers in the background. The background moves can be scheduled in firmware with another bitonic network using the new control state (e.g., cs2).

In several applications such as dynamic wear leveling, which changes its random memory map from LBA to PBA on a periodic basis, the system 200 may need to compute a cumulative random mapping at any given time point so that a given LBA can be precisely located at a correct PBA. In one example, assume a random map of memory of size 2^32 with a mapping function Ma) at time t1, a random map of memory of size 2^32 with a mapping function f2 at time t2, a random map of memory of size 2^32 with a mapping function f3 at time t3, . . . , and a random map of memory of size 2^32 with a mapping function fn at time tn. In operation, the system 200 can compute a cumulative function (cfn) at time tn, such that cfn=fn(cfm), and where cfm is cumulative function at time tm and tm=tn−1. In one aspect, the system 200 can generate a random mapping function (fn) using a bitonic network and a random control switch seed (e.g., using the cumulative state computation block 204). The bitonic network can be configured to provide the random mapping function (fn) using a random control switch seed (e.g., cs1, cs2, . . . , csn). The cumulative function (cfn) can now be passed through a master bitonic sorter and the control switch positions are recorded in the sorting process. These control switch positions, CCSn, can now be used to program a bitonic network with a data width of 1 and a network size of 32 to generate cumulative random mapping for 2^32 entries (e.g., using access network 202). At any time, any of 2^32 entries can be passed through this network to generate a permuted address. These operations will be described in greater detail below, and more specifically with respect to FIGS. 10-13.

The background swap scheduler 208 is configured to perform periodic swaps of data stored at preselected PBAs. In one aspect, the background swap scheduler 208 may be configured to perform one swap per every 100 host writes. In another aspect, the background swap scheduler 208 may be configured to perform one swap per every X host writes, where X is a positive integer. In one aspect, the background swap scheduler 208 is configured to perform moves according to a new map for two pages (swap) and thus moves are scheduled for every 200 host writes. The background swap scheduler 208 may maintain a move counter which may be incremented by 1 for every 200 host writes. In one aspect, moves are done in structured fashion on the physical memory using a lookup of a bitonic network using the new control state (e.g., cs2). In one aspect, the move counter (e.g., move index) gets incremented from 1 to N/2. The move counter can also be referred to as move index, move_index, MOVE_INDEX, move_counter, and move counter. For each value, a swap is scheduled such that physical memory at the move counter gets swapped with the physical memory. In one embodiment, for example, the background swap scheduler 208 can perform the swap as follows:

Physical addr1=MOVE_INDEX;
Physical addr2=f_cs2(Physical_addr1);
SWAP (Physical Addr1, Physical Addr2)

In such case, f_cs2 is a resulting random mapping function based on control state cs2. The determination of cs2 is described in greater detail below in the discussion of FIG. 10. In one example, cs2 can be a randomly generated bit sequence of length 320 bits for a bitonic network with 32 inputs and 32 outputs.

In one embodiment, the MOVE_INDEX is set to 0 in the initial memory and second memory map block 206 and also in the mapping state generation and change block 210. In the background swap scheduler 208 the MOVE_INDEX can be incremented by 1 for an arbitrary number of host writes (e.g., per every 100 host writes as in FIG. 2 or per 200 host writes or another suitable number of host writes). In another embodiment, the MOVE_INDEX increment logic can be implemented in hardware as it may be easier to keep track of the host writes in hardware. In such case, MOVE_INDEX can be communicated from a new hardware logic block that implements the MOVE_INDEX increment logic to the background swap scheduler 208 and directly communicates MOVE_INDEX to the access network block 202 instead of being communicated from the background swap scheduler 208 (e.g., firmware) to the access network 202 (e.g., hardware).

In one aspect, these operations of the background swap scheduler 208 may result in a 1 percent write amplification. In one aspect, the swap operation is assumed to be atomic.

The mapping state generation and change block 210 is configured to update control states and cumulative control states once all of the swap transfers are complete. In one aspect, when the move index is equal to N/2, then all of the swap transfers from the previous map to the current map should be complete. Once completed, the mapping state generation and change block 210 can then generate a new map. In one aspect, the move counter (e.g., move index) can be reset (e.g., to 0 or 1). Whenever the mapping change is done, cumulative control states can be computed in firmware and can be supplied to hardware. These values can be scheduled a little in advance in the firmware (e.g., in the mapping state generation and change block 210) to ensure timely communication to the hardware (e.g., access network 202). In one aspect, the old control state (cs1) may be set to the new control state (cs2), and the old cumulative control state (CCS1) may be set to the new cumulative control state (CCS2).

Aspects of the access network 202 and the cumulative state computation block 204 will be discussed in greater detail below.

Example Wear Leveling Process

Figure 3:
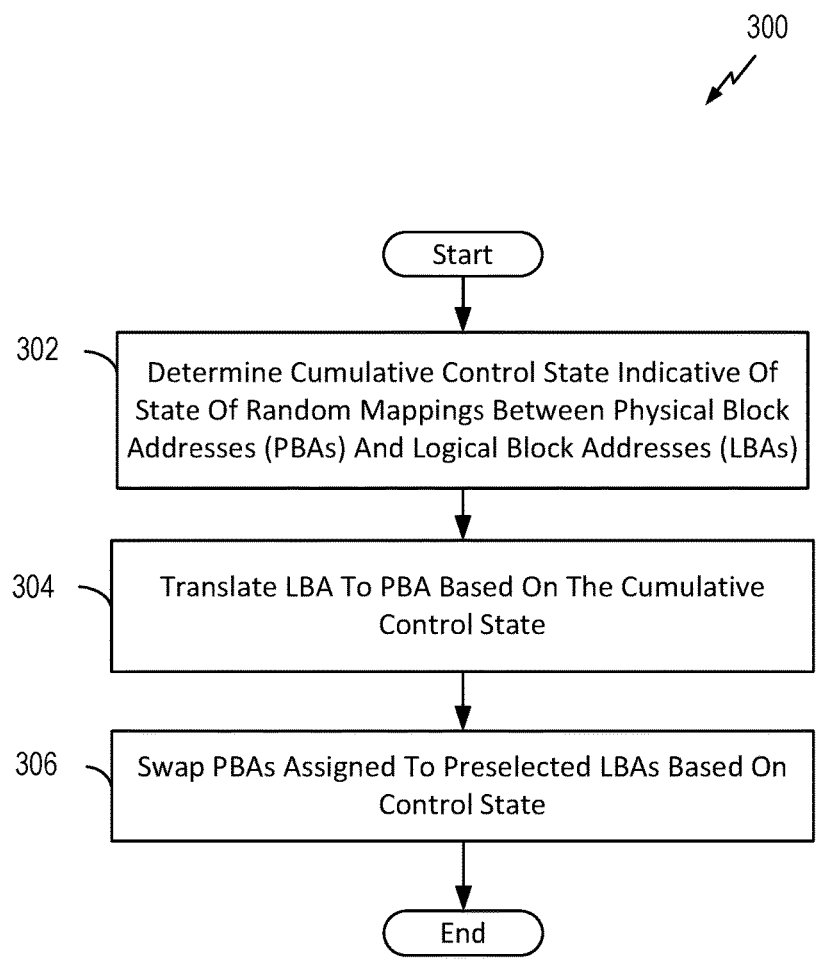
FIG. 3 is a flow chart of a process for wear leveling in accordance with one embodiment of the disclosure.

FIG. 3 is a flow chart of a process 300 for wear leveling in accordance with one embodiment of the disclosure. In one embodiment, the process 300 can be performed by the wear leveling system 200 of FIG. 2, or any of the other wear leveling systems described herein.

In block 302, the process determines a cumulative control state indicative of a state of random mappings between physical block addresses (PBAs) and logical block addresses (LBAs). In certain aspects, the actions of block 302 may be effectuated with the controller 108, or with the controller 108 in combination with the host 102 as illustrated in FIG. 1. In certain aspects, block 302 may be effectuated with the wear leveling system 200 of FIG. 2, including the cumulative state computation determiner 204, the controller 108 of FIG. 1, and/or any combination of those components. In one aspect, block 302 may be effectuated with the cumulative state computation determiner 204.

In block 304, the process translates a logical block address (LBA) to a physical block address (PBA) based on the cumulative control state. In certain aspects, the actions of block 304 may be effectuated with the controller 108, or with the controller 108 in combination with the host 102 as illustrated in FIG. 1. In certain aspects, block 304 may be effectuated with the wear leveling system 200 of FIG. 2, including the access network 202, the controller 108 of FIG. 1, and/or any combination of those components. In one aspect, block 304 may be effectuated with the access network 202.

In block 306, the process swaps PBAs assigned to preselected LBAs based on a control state. In certain aspects, the actions of block 306 may be effectuated with the controller 108, or with the controller 108 in combination with the host 102 as illustrated in FIG. 1. In certain aspects, block 306 may be effectuated with the wear leveling system 200 of FIG. 2, including the background swap scheduler 208, the controller 108 of FIG. 1, and/or any combination of those components. In one aspect, block 306 may be effectuated with the background swap scheduler 208.

In one aspect, the cumulative control state includes a first cumulative control state and a second cumulative control state, where the control state includes a first control state and a second control state, and where the second cumulative control state is a function of the first cumulative control state and the second control state. The cumulative control states (e.g., CCS1 and CCS2) and control states (e.g., cs1, cs2) are described in more detail above with respect to FIG. 2, and below with respect to FIG. 11.

In one aspect, the process may further include changing from a first memory map to a second memory map after swapping a preselected number of PBAs, where the first memory map and the second memory map each include a preselected number of PBAs. In one aspect, this may be performed by the mapping state block 210 of FIG. 2.

In one aspect, the swapping of PBAs assigned to preselected LBAs based on the control state includes swapping PBAs after a preselected number of accesses of a non-volatile memory of the non-volatile memory system. In one aspect, the preselected number of accesses can be 100 writes of the non-volatile memory.

In one aspect, the process 300 further includes generating a first PBA candidate from a LBA using a first function, generating a second PBA candidate from the LBA using a second function, and selecting either the first PBA candidate or the second PBA candidate for data access based on information related to a background swap of data stored at the first PBA candidate and a background swap of data stored at the second PBA candidate. In one aspect, these actions may be performed by the access network 202 of FIG. 2 or the access network 300 of FIG. 3. In one aspect, at least one of the first function or the second function includes a function performed by at least one of a multi-stage interconnection network or a block cipher. In one aspect, the second cumulative control state reflects switch settings used to achieve a sort of a permutation of the first cumulative control state where the permutation is generated using the second control state.

Figure 4:
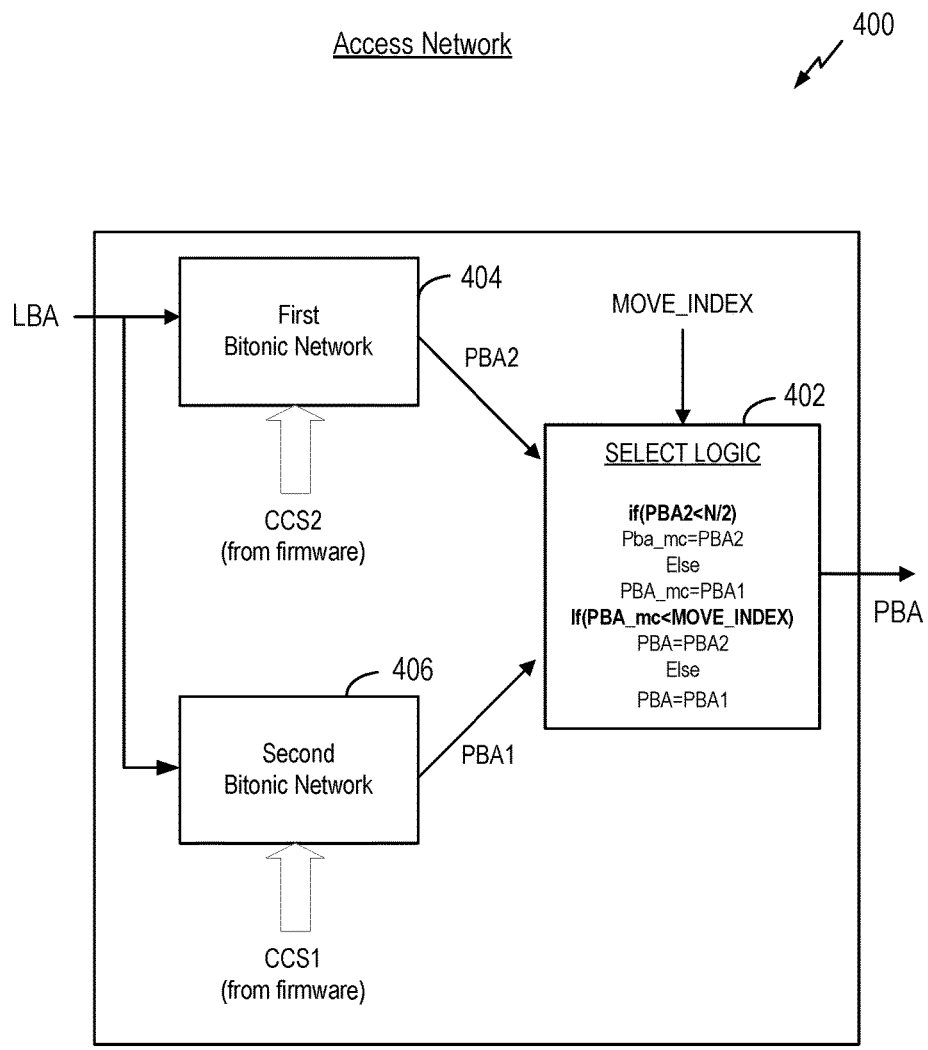
FIG. 4 is a block diagram of an access network, including a select logic block that can be used in the address mapping system of FIG. 2, to map a LBA to a PBA in accordance with one embodiment of the disclosure.

FIG. 4 is a block diagram of an access network 400, including a select logic block 402 that can be used in the address mapping system of FIG. 2, to map a LBA to a PBA in accordance with one embodiment of the disclosure. In one aspect, the access network 400 can be used in the system of FIG. 2 as access network 202. The system 400 further includes a first bitonic network 404 and a second bitonic network 406. The first bitonic network 404 can receive the LBA and new cumulative control state (CCS2) and generate a second possible physical block address (PBA2). Similarly, the second bitonic network 406 can receive the LBA and old cumulative control state (CCS1) and generate a first possible physical block address (PBA1). The select logic 402 can then analyze the locations of the possible PBAs in the page to determine which one is correct mapping using a preselected algorithm. More specifically, the select logic 402 can compare PBA2 to the number of PBAs in the page (N) divided by 2 (e.g., N/2). If PBA2 is less than N/2, then a temporary variable (Pba_mc) is set to PBA2. Otherwise, Pba_mc is set to PBA1. If Pba_mc is less than the move index (MOVE_INDEX) from the background swap scheduler 208 of FIG. 2, then the correct PBA (e.g., output PBA) is PBA2. Otherwise, the correct PBA is PBA1. The operation of the select logic 402 will be described further below.

In one aspect, the select logic block 402 can effectively determine which of two possible PBAs (e.g., PBA1 and PBA2) contains the actual data that corresponds to the LBA of interest. This determination is based on a mid-point of the PBAs in the page (e.g., N/2) and the move index. In comparing the addresses of PBA1 and PBA2 to the mid-point and move index, the select logic block 402 effectively determines which of the two PBAs contains the actual data that corresponds to the LBA of interest at a given time. For example, in FIG. 6, which will be discussed in greater detail below, LBA 9 is stored in PBA 3 at time period CF0, in PBA 11 at CF1, in PBA 8 at CF2, in PBA 14 at CFn−1, and in PBA 4 at CFn. The system can keep track of the last two possible locations, PBA 14 and PBA 4, which are the outputs of the ccs1 and ccs2 functions. The select logic block 402 can then exactly determine whether the data related to LBA 9 is still there at PBA 14 or moved to PBA 4.

In one aspect, the first bitonic network 404 and the second bitonic network 406 can be replaced with a first network and a second network, respectively. In such case, the first network can be configured to generate a first PBA candidate from a LBA using a first function, and the second network can be configured to generate a first PBA candidate from a LBA using a second function. In one aspect, the first function and/or the second function may be a function performed by a multi-stage interconnection network and/or a block cipher. The multi-stage interconnection network may be implemented with one or more of a Benes network, an inverse Benes network, a Bitonic network, an inverse Bitonic network, an Omega network, an inverse Omega network, a Butterfly network, or an inverse Butterfly network. In one aspect, the first function and/or the second function may include an exclusive OR function and a function performed by a multi-stage interconnection network and/or a block cipher.

Figure 5:
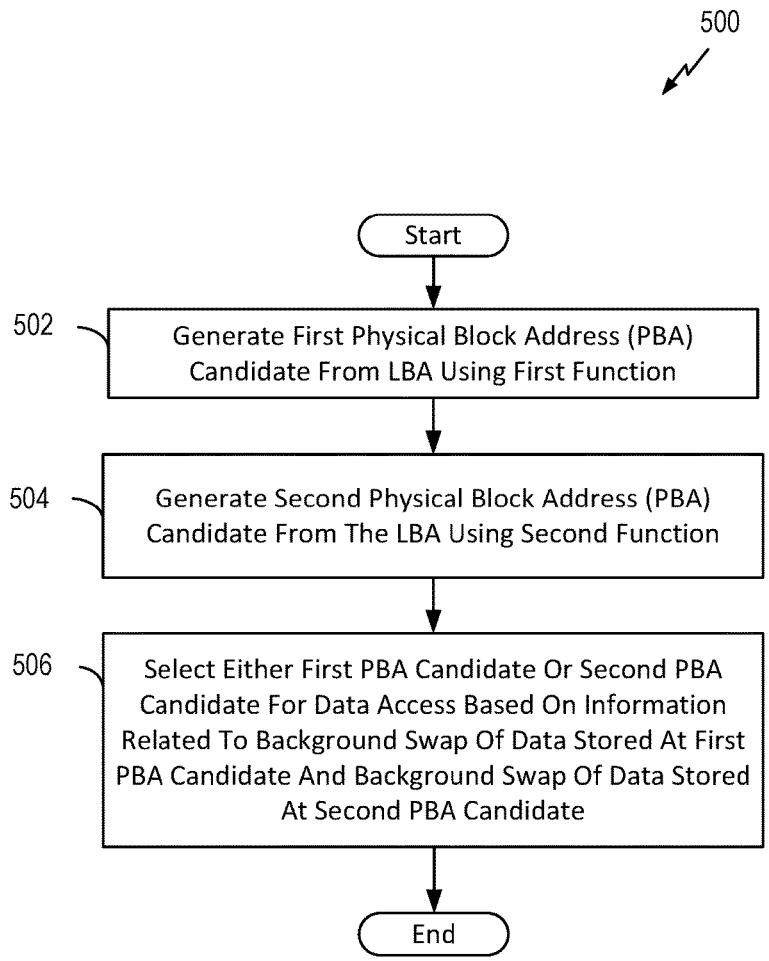
FIG. 5 is a flow chart of a process for mapping a LBA to a PBA in accordance with one embodiment of the disclosure.

In one aspect, any one of the select logic 402, the first bitonic network 404, and/or the second bitonic network 406 can be a special purpose processor or other suitable hardware specifically (such as an application specific integrated circuit or other hardware described above) configured/programmed to perform any of the functions contained within the application, such as the functions illustrated in FIG. 5.

FIG. 5 is a flow chart of a process 500 for mapping a LBA to a PBA in accordance with one embodiment of the disclosure. In one embodiment, the process 500 can be performed by the access network 400 of FIG. 4, or any of the other local address mapping systems described herein. In block 502, the process generates a first physical block address (PBA) candidate from a LBA using a first function. In one aspect, the first function may be a function performed by the first network (e.g., first bitonic network 404 of FIG. 4) as described above. In certain aspects, the actions of block 502 may be effectuated with the controller 108, or with the controller 108 in combination with the host 102 as illustrated in FIG. 1. In certain aspects, block 502 may be effectuated with the first bitonic network 404 of FIG. 4, the second bitonic network 406 of FIG. 4, the select logic 402 of FIG. 4, the controller 108 of FIG. 1, and/or any combination of those components. In one aspect, block 502 may be effectuated with the first bitonic network 404. In one aspect, block 502 may represent one means for generating a first PBA candidate from a LBA using a first function.

In block 504, the process generates a second physical block address (PBA) candidate from the LBA using a second function. In one aspect, the second function may be a function performed by the second network (e.g., second bitonic network 406 of FIG. 4) as described above. In certain aspects, the actions of block 504 may be effectuated with the controller 108, or with the controller 108 in combination with the host 102 as illustrated in FIG. 1. In certain aspects, block 504 may be effectuated with the first bitonic network 404 of FIG. 4, the second bitonic network 406 of FIG. 4, the select logic 402 of FIG. 4, the controller 108 of FIG. 1, and/or any combination of those components. In one aspect, block 504 may be effectuated with the second bitonic network 406. In one aspect, block 504 may represent one means for generating a second PBA candidate from a LBA using a second function.

In block 506, the process selects either the first PBA candidate or the second PBA candidate for the data access based on information related to a background swap of data stored at the first PBA candidate and a background swap of data stored at the second PBA candidate. In one aspect, the process selection may be performed by the select logic 402 of FIG. 4. In certain aspects, the actions of block 506 may be effectuated with the controller 108, or with the controller 108 in combination with the host 102 as illustrated in FIG. 1. In certain aspects, block 506 may be effectuated with the select logic 402 of FIG. 4, the controller 108 of FIG. 1, and/or any combination of those components. In one aspect, block 506 may be effectuated with the select logic 402. In one aspect, block 506 may represent one means for selecting either the first PBA candidate or the second PBA candidate for the data access based on information related to a background swap of data stored at the first PBA candidate and a background swap of data stored at the second PBA candidate.

In one aspect, the information related to the background swap of data stored at the first PBA candidate and the background swap of data stored at the second PBA candidate includes a status of the background swap of data stored at the first PBA candidate and a status of the background swap of data stored at the second PBA candidate. In one aspect, the first PBA candidate and the second PBA candidate may be contained within a PBA map. In such case, examples of the status data may include a position of the second PBA candidate relative to a midpoint of all entries in the PBA map, a PBA move counter based on the position of the second PBA candidate, and/or a move index indicative of a current position of PBA swaps within the PBA map. Examples of the selection process and the use of the mapping status data will be described in further detail below.

In one aspect, the process 500 can also include mapping a portion of a physical address space containing the selected PBA candidate to another portion of the physical address space using at least one of a background data move or a background data swap. In one aspect, this mapping can be performed by the background swap scheduler 208 of FIG. 2.

Figure 12:
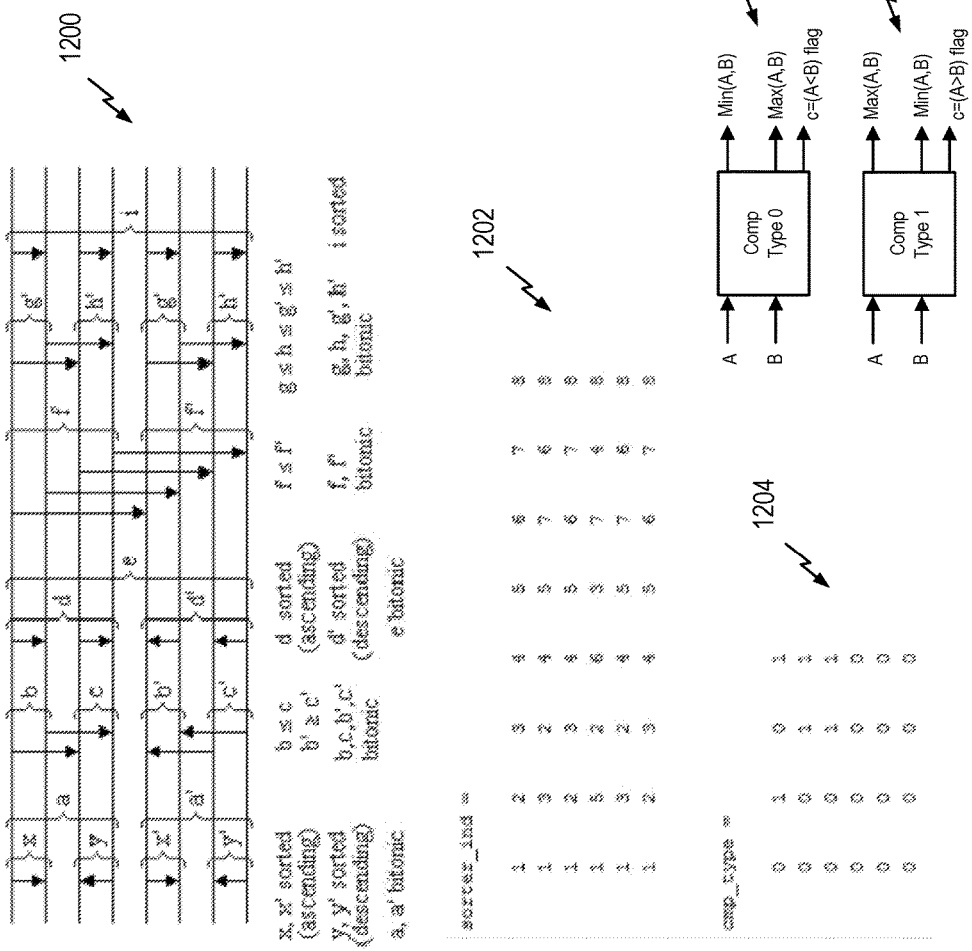
FIG. 12 is a diagram of a bitonic sorter including a sorter table and comparison type table in accordance with one embodiment of the disclosure.

In an alternative embodiment, the selecting either the first PBA candidate or the second PBA candidate can be performed using a memory table (see for example system 1200 of FIG. 12 that may store various control states in a ROM or other suitable memory).

In one aspect, the process enables data access of an NVM, where the data access may be a read access or a write access.

FIGS. 6-9 are diagrams of exemplary physical block addresses at discrete times illustrating operation of the select logic on mapping LBAs to PBAs for example values of the PBAs and move index variables in accordance with one embodiment of the disclosure.

Figure 6:
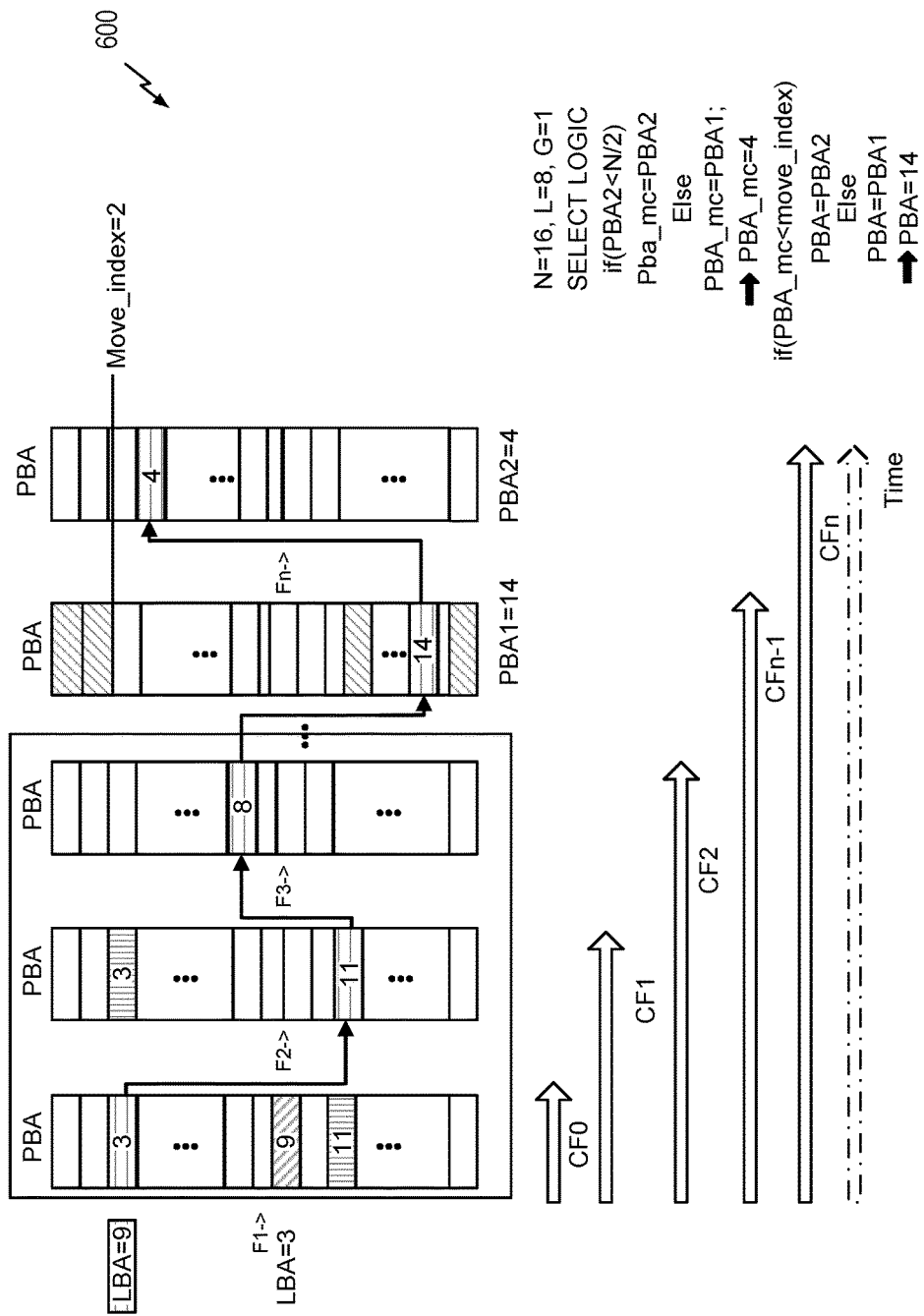
FIGS. 6-9 are diagrams of exemplary physical block addresses at discrete times illustrating operation of the select logic on mapping LBAs to PBAs for example values of the PBAs and move index variables in accordance with one embodiment of the disclosure.

FIG. 6 illustrates operation of the select logic with example values of the PBAs and move index variables where the first condition (e.g., PBA2<N/2) is satisfied and the second condition (e.g., PBA_mc<move_index) is not satisfied such that the correct PBA is PBA1 or slot 14. The diagram 600 shows the physical block address (PBA) memory maps at different time stages (e.g., CF0 to CFn). The select logic operates using the last two memory maps (CFn and CFn-1). Input variables include the move index (move_index=2), the number of entries in the PBA map (N=16), the local bits permuted (L=8), and the global bits permuted (G=1). While variables L and G are shown, they may or may not be used in the select logic. Since the PBA2 is a location that has not been swapped since it is less than the move index (move_index=2 for this example), the select logic effectively determines that PBA2 is not correct and selects PBA1 which it knows to be correct. More specifically, in the first condition, the select logic determines that PBA2=4 is less than N/2=8. Thus, Pba_mc is set to PBA2=4. In the second condition, the select logic determines that Pba_mc=4 is not less than the move_index=2, and thus sets the output PBA to be PBA1=14.

In one aspect, the first condition can be changed to compare PBA1 to N/2 (e.g., PBA1>=N/2).

Figure 7:
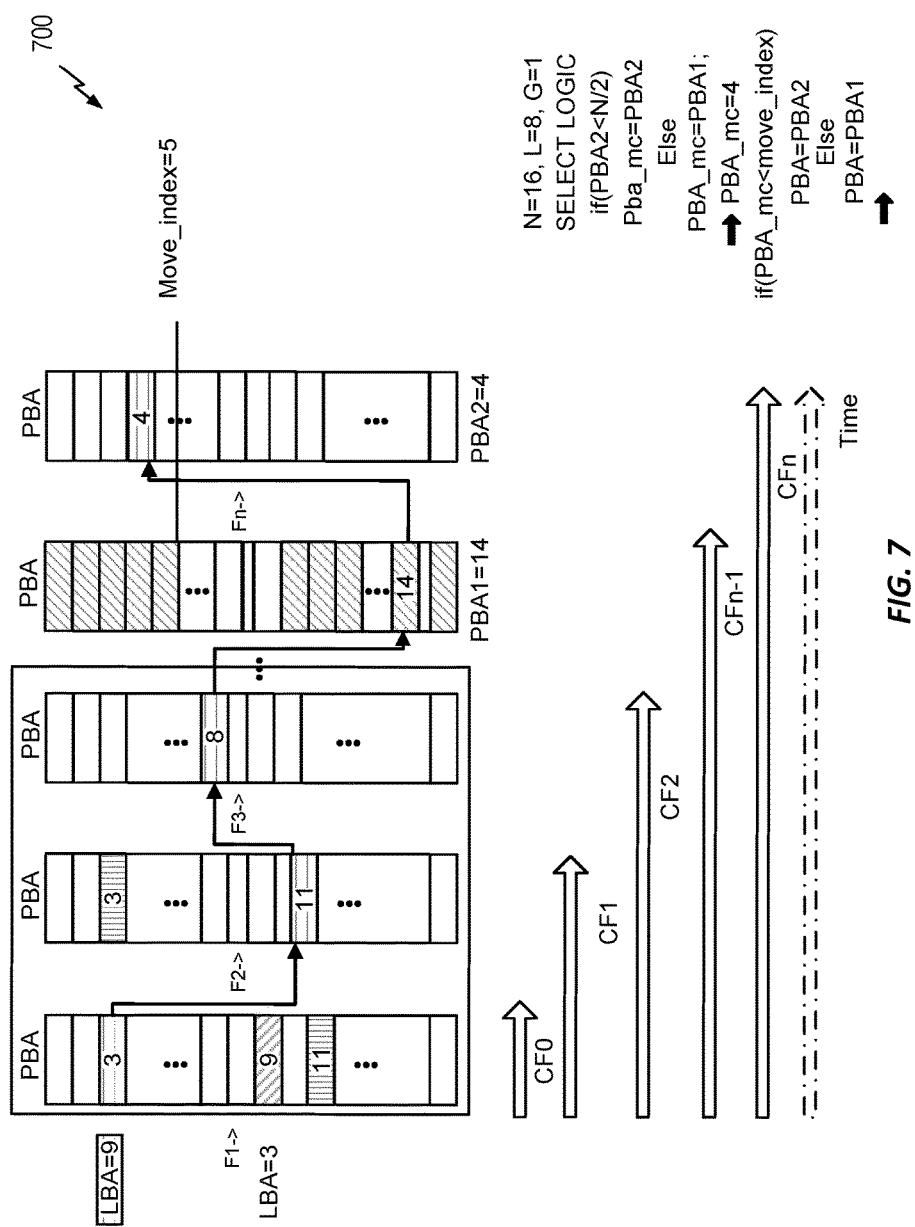

FIG. 7 illustrates operation of the select logic with example values of the PBAs and move index variables where the first condition (e.g., PBA2<N/2) is satisfied and the second condition (e.g., PBA_mc<move_index) is satisfied such that the correct PBA is PBA2 or slot 4. The diagram 700 shows the physical block address (PBA) memory maps at different time stages (e.g., CF0 to CFn). The select logic operates using the last two memory maps (CFn and CFn-1). Input variables include the move index (move_index=5), the number of entries in the PBA map (N=16), the local bits permuted (L=8), and the global bits permuted (G=1). While variables L and G are shown, they may or may not be used in the select logic. Since the PBA2 is a slot that has been swapped since it is less than the move index (move_index=5 for this example), the select logic effectively determines that PBA2 is correct and selects it. More specifically, in the first condition, the select logic determines that PBA2=4 is less than N/2=8. Thus, Pba_mc is set to PBA2=4. In the second condition, the select logic determines that Pba_mc=4 is less than the move_index=5, and thus sets the output PBA to be PBA2=4.

Figure 8:
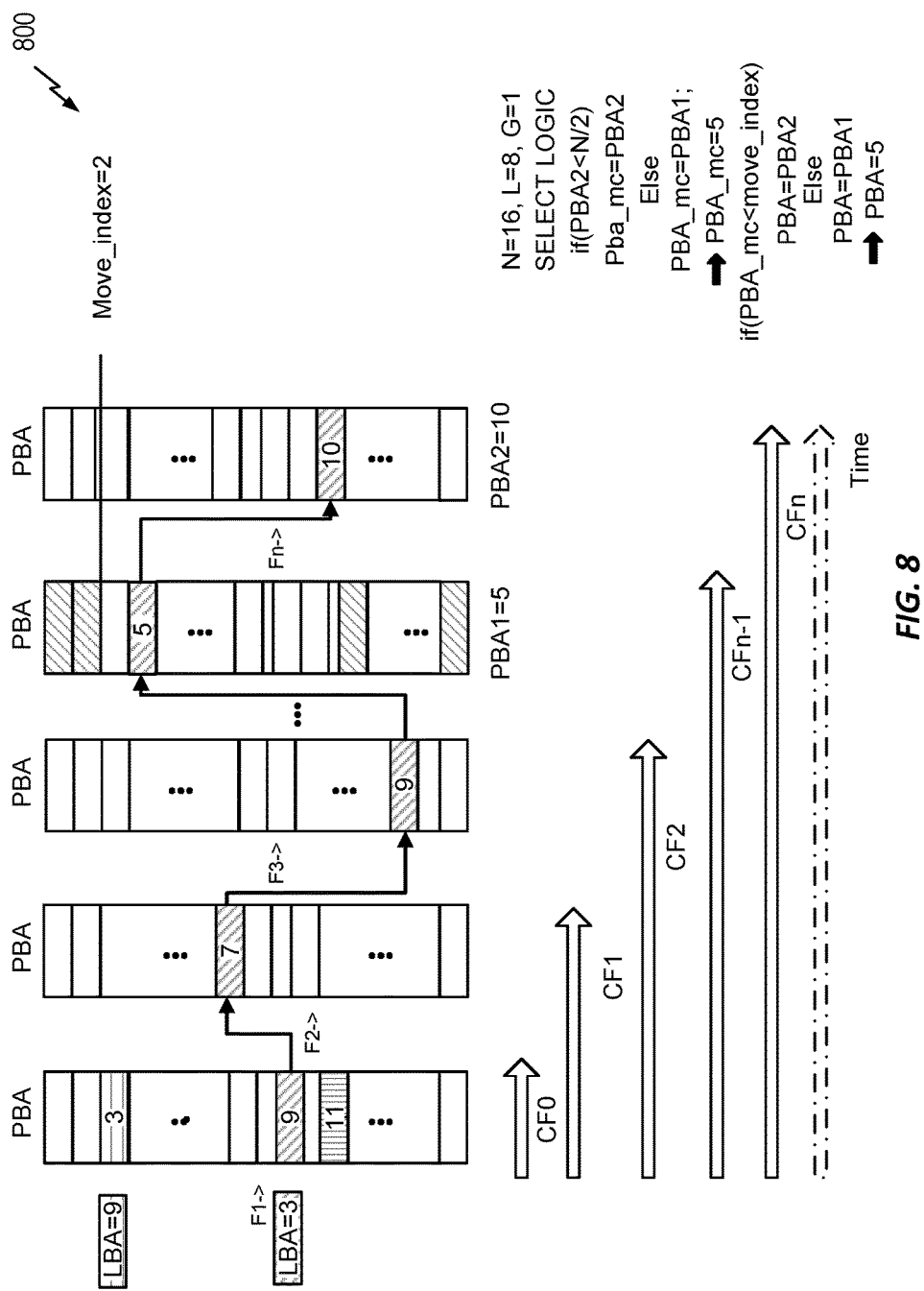
Figure 9:
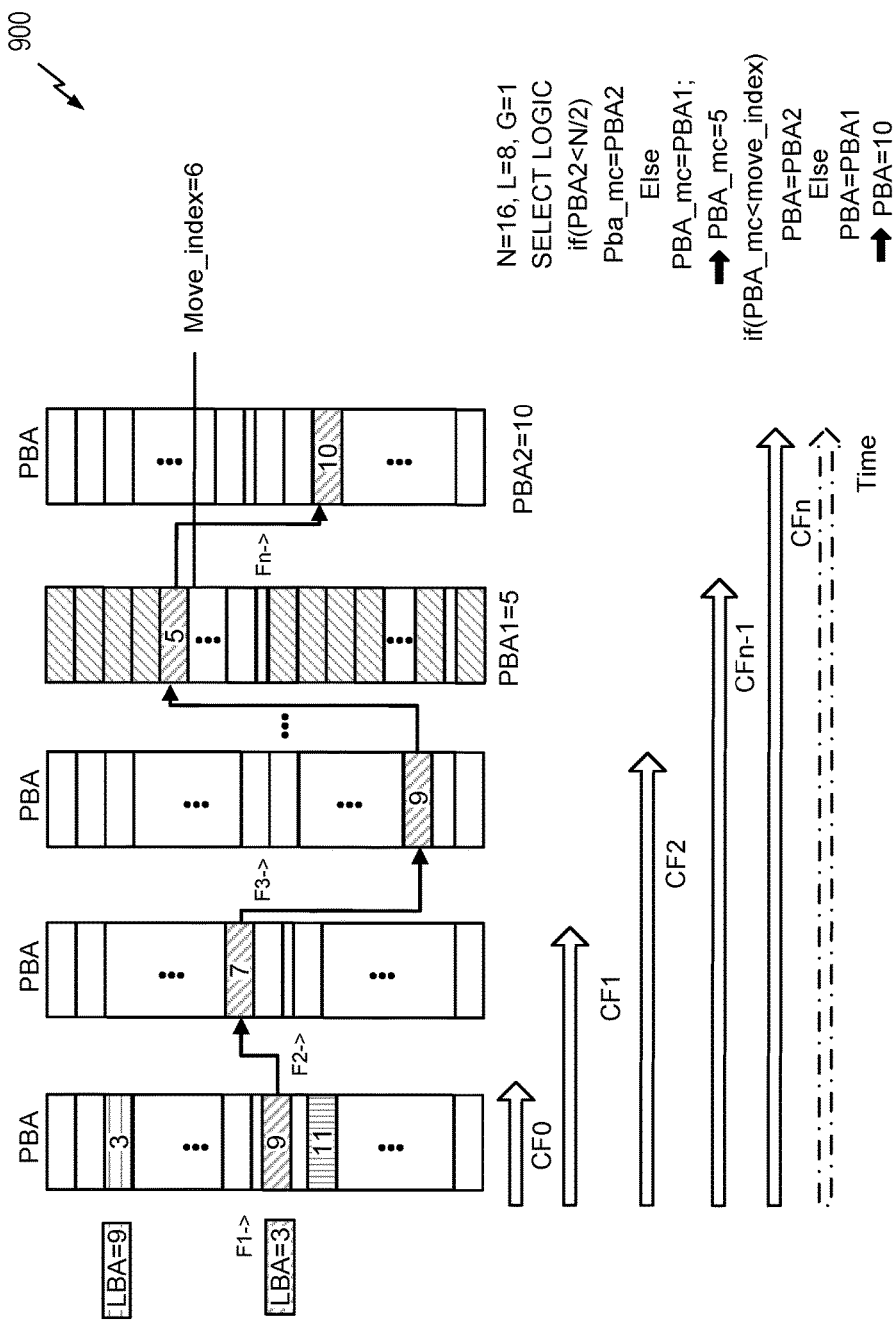

FIG. 8 illustrates operation of the select logic with example values of the PBAs and move index variables where the first condition (e.g., PBA2<N/2) is not satisfied and the second condition (e.g., PBA_mc<move_index) is satisfied such that the correct PBA is PBA1 or slot 5. The diagram 800 shows the physical block address (PBA) memory maps at different time stages (e.g., CF0 to CFn). The select logic operates using the last two memory maps (CFn and CFn-1). Input variables include the move index (move_index=2), the number of entries in the PBA map (N=16), the local bits permuted (L=8), and the global bits permuted (G=1). While variables L and G are shown, they may or may not be used in the select logic. Since the PBA2 is a slot (e.g., slot 10) that has not been swapped since it is greater than the move index (move_index=2 for this example), the select logic effectively determines that PBA2 is not correct and selects PBA1 which it knows to be correct. More specifically, in the first condition, the select logic determines that PBA2=10 is not less than N/2=8. Thus, Pba_mc is set to PBA1=5. In the second condition, the select logic determines that Pba_mc=5 is not less than the move_index=2, and thus sets the output PBA to be PBA1=5.

Figure 10:
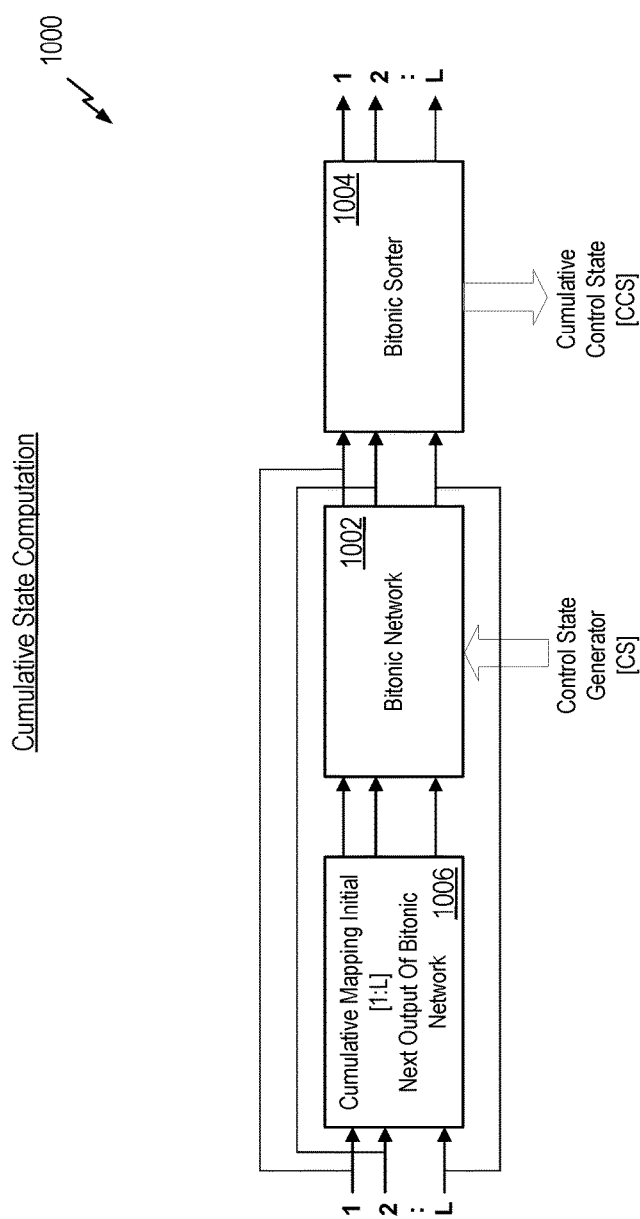
FIG. 10 is a block diagram of a cumulative state computation block including a bitonic network and a bitonic sorter that can be used in the address mapping system of FIG. 2 in accordance with one embodiment of the disclosure.

FIG. 10 illustrates operation of the select logic with example values of the PBAs and move index variables where the first condition (e.g., PBA2<N/2) is not satisfied and the second condition (e.g., PBA_mc<move_index) is not satisfied such that the correct PBA is PBA2 or slot 10. The diagram 1000 shows the physical block address (PBA) memory maps at different time stages (e.g., CF0 to CFn). The select logic operates using the last two memory maps (CFn and CFn-1). Input variables include the move index (move_index=6), the number of entries in the PBA map (N=16), the local bits permuted (L=8), and the global bits permuted (G=1). While variables L and G are shown, they may or may not be used in the select logic. Since the PBA2 is a slot (e.g., slot 10) that has been swapped since PBA1 was swapped to PBA2 (move index=6 is greater than PBA1=5), the select logic effectively determines that PBA2 is correct and selects it. More specifically, in the first condition, the select logic determines that PBA2=10 is not less than N/2=8. Thus, Pba_mc is set to PBA1=5. In the second condition, the select logic determines that Pba_mc=5 is less than the move_index=6, and thus sets the output PBA to be PBA2=10.

Cumulative State Computation Examples

FIG. 10 is a block diagram of a cumulative state computation block 1000 including a bitonic network 1002 and a bitonic sorter 1004 that can be used in the address mapping system of FIG. 2 in accordance with one embodiment of the disclosure. The cumulative state computation block 1000 further includes an cumulative mapping block 1006 that may generate/perform some initial mapping and receives the next output of the bitonic network 1002 via feedback. The bitonic network 1002, a time varying network which can also be a master bitonic network in this system, receives the output of the cumulative mapping block 1006 and the control state (cs) and generates a new cumulative mapping. The bitonic sorter 1004 receives the new cumulative mapping and determines the switch settings (e.g., cumulative control states or CCS2) needed to go from the initial cumulative mapping to the new cumulative mapping.

In one aspect, at any given time, the system may store the last two values for CCS (for access determination in the hardware or access network) and the current values for CS (for moving). So in one example the control state memory is only about 960 bits (e.g., 320×3 bits). In such case, a global mapping bit for these three mappings (i.e., 3 more bits) may need to be preserved.

As to the use of a bitonic network as compared with a Benes network (described above in discussion of FIG. 4), the bitonic network can have log 2(L/2)*(log 2(L/2)+1)/2*L/2 switches, while the Benes network can have 2*log 2(L/2)*L/2 switches. For example, values of L=32 such that L/2=16, the Benes network can have 8 (=2*log 2(16)) stages of switches where each stage consists of 16 (=L/2) switches. In such case, the bitonic network has 20 (=4*(4+1)/2(=log 2(16)*(log 2(16)+1)/2) stages of switches where each stage consists of 16 (=L/2) switches. So the bitonic network may need to be pipelined more to achieve one address look up for a cycle. So the number of 2 by 2 switches needed for the bitonic network in one aspect may thus be 320 versus 128 for the Benes network, which is still small. In one aspect, each switch has two 1-bit multiplexers and each switch needs 3 gates (2 AND gates and 1 OR gate). So it appears that about 2000 gates versus about 700 gates (exact calculation is 320×6 gates versus 128×6 gates) may be used to implement each network. In one aspect, this may result in 4000 gates for the bitonic network versus 1400 gates for the Benes network. However, the firmware may be much simpler for the bitonic network.

Aspects of the bitonic sorter and bitonic network will be described in greater detail below. In one aspect, these two components can work together to generate random mappings for wear leveling while also providing a path back to any one of the given mappings to later determine exactly what logical address was mapped to which physical address. In one aspect, the bitonic network works to generate a random mapping while the bitonic sorter works to generate a "key" (e.g., cumulative control state or CCS) to return to the random mapping later.

Figure 11:
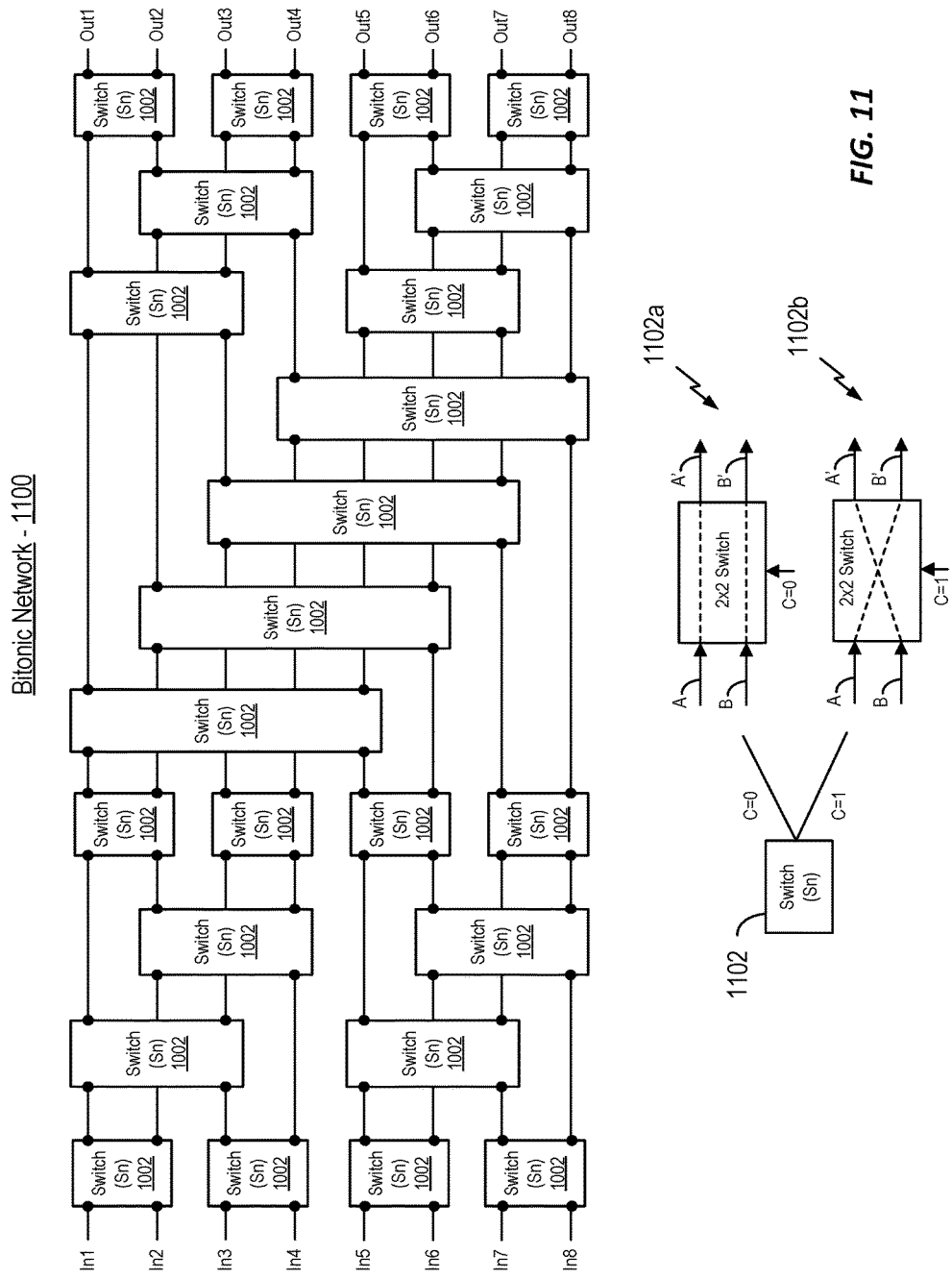
FIG. 11 is a diagram of a bitonic network in accordance with one embodiment of the disclosure.

FIG. 11 is a diagram of a bitonic network 1100 in accordance with one embodiment of the disclosure. In the illustrated embodiment, the bitonic network 1100 is an 8 by 8 type network with 8 inputs and 8 outputs. In other embodiments, the bitonic network can have a different number of inputs and outputs. The bitonic network 1100 includes 24 two by two switches (Sn) 1102, where each switch 1102 is either in a pass through configuration 1102a or a switched configuration 1102b. In the pass through configuration 1102a, corresponding inputs are connected to corresponding outputs (e.g., A is passed to A' and B is passed to B'). In the crossed configuration 1102b, inputs are connected to non-corresponding outputs (e.g., A is passed to B' and B is passed to A'). Each switch 1102 receives a control input "C" which determines the switch configuration.

In operation, the bitonic network 1100 may receive 8 bits of input, which may be a first randomly ordered list, and switch settings for each of the switches 1102, which may be random switch settings, and may determine a permutation of the inputs (e.g., first randomly ordered list) using the random switch settings, where the permutation (output) is a second randomly ordered list. In one aspect, the 8 bits of input or first randomly ordered list may be an initial cumulative control state (CCS) or subsequent CCS. In one aspect, the switch settings may be set in accordance with a current control state (CS).

FIG. 12 is a diagram of a bitonic sorter 1200 including a sorter table 1202 and comparison type table 1204 in accordance with one embodiment of the disclosure. A bitonic sorter can have log 2(L/2)*(log 2(L/2)+1)/2*L/2 comparators. For an example, say L=8, and thus L/2=4. In such case, the bitonic sorter can have six stages of comparators, where log 2(8)*(log 2(8)+1)/2=3*(3+1)/2=6, and each stage consists of 4 (=L/2) comparators.

The comparison type table 1204, or "cmp_type", is a matrix of a size with the number of rows equal to log 2(L/2)*(log 2(L/2)+1)/2 (e.g., equal to number of stages of comparators=6) and the number of columns equal to L/2 (e.g., equal to number of comparators in each stage=4). So for L=8, as in the working example, cmp_type 1204 is a matrix of size 6×4. The first row (or in general ith row) in this cmp_type matrix 1204 corresponds to a comparator type of the first stage of comparators (or in general ith stage of comparators) in diagram 1200. The comparator type 0 (e.g., row 1, column 1 of cmp_type 1204) means a comparator 1206 ("Comp Type 0") taking two inputs (A, B) and presenting the outputs (out1, out2) such that first output is the smaller number among the inputs (e.g., out1=minimum (A,B) or Min(A,B)) and second output is the larger number among the inputs (e.g., out2=maximum(A,B) or Max(A,B)). This is shown with the down arrow in diagram 1200. In one aspect, the comparator 1206 also gives an output bit (e.g., "c") that is equal to 1 if input A is less than input B. In another aspect, the comparator can also give an output bit that is equal to 1 if a swap occurred (e.g., out1=B, out2=A), to 0 if no swap occurred (e.g., out1=A and out2=B). This aspect is not shown in diagram 1200.

The comparator type 1 (e.g., row 1, column 2 of cmp_type 1204) means a comparator 1208 ("Comp Type 1") taking two inputs (A, B) and presenting the outputs (out1, out2) such that the first output is the larger number among the inputs (e.g., out1=maximum(A,B) or Max(A,B)) and the second output is the smaller number among the inputs (e.g., out2=minimum(A,B) or Min(A,B)). This is shown with the upward arrow in diagram 1200. In one aspect, the comparator 1208 also gives an output bit (e.g., "c") that is equal to 1 if input A is greater than input B. In another aspect, the comparator 1208 also gives an output bit that is equal to 1 if a swap occurred (e.g., out1=B, out2=A), to 0 if no swap occurred (e.g., out1=A, out2=B). This aspect is not shown in diagram 1200.

The sorter table 1202, "sorter_ind", is a matrix of a size with a number of rows equal to log 2(L/2)*(log 2(L/2)+1)/2 (e.g., equal to number of stages of comparators or 6) and a number of columns equal to L (e.g., equal to number of inputs to each stage of comparators or 8). So for L=8, as in the working example, the sorter_ind 1202 is a matrix of size 6×8. The first row (or in general ith row) in this sorter_ind matrix 1202 corresponds to the port numbers that are connected to the inputs of each stage of bitonic network.

In one aspect, a sequence can be bitonic if it monotonically increases and then monotonically decreases, or if it can be circularly shifted to monotonically increase and then monotonically decrease.

In one aspect, a bitonic network can have the same topology as that of the bitonic sorter 1200 except that that comparators are replaced with 2 by 2 switches with control inputs.

Figure 13:
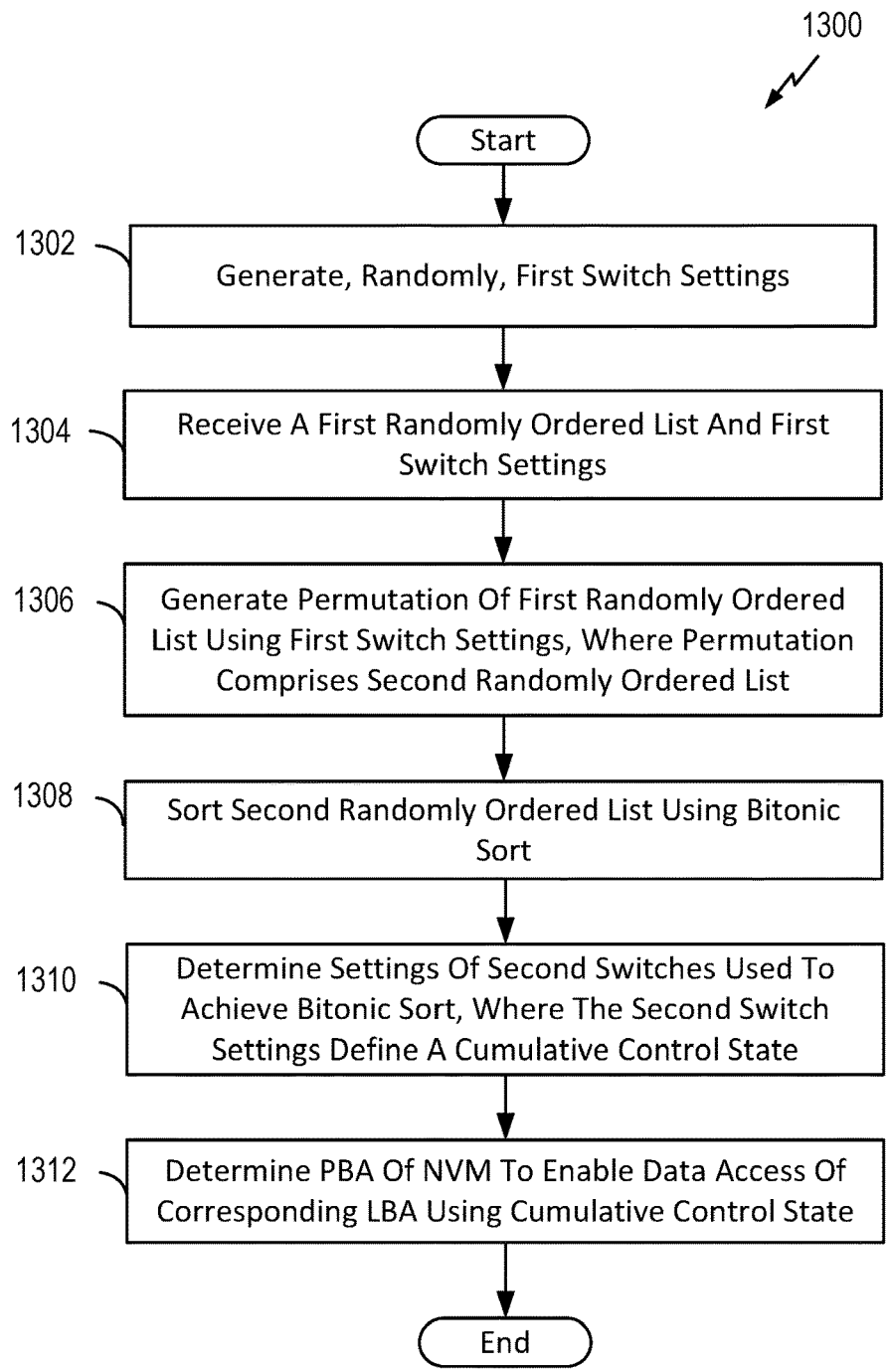
FIG. 13 is a flow chart of a process for determining cumulative control state for mapping LBAs to PBAs in accordance with one embodiment of the disclosure.

FIG. 13 is a flow chart of a process 1300 for determining cumulative control state for mapping LBAs to PBAs in accordance with one embodiment of the disclosure. In one embodiment, the process can be used to determine cumulative control state in any of the address mapping systems described herein, including for example the cumulative state computation block 204 of FIG. 2 and the cumulative state computation block 1000 of FIG. 10. In block 1302, the process generates, randomly, first switch settings. In one aspect, the first switch settings may be generated using a random number generator. In one aspect, the first switch settings may be generated using the control state (CS) as described above for the systems of FIGS. 2 and 10. In block 1304, the process receives a first randomly ordered list and the first switch settings. In block 1306, the process generates a permutation of the first randomly ordered list using the first switch settings, where the permutation includes a second randomly ordered list. In one aspect, the permutation results in the second randomly ordered list. In one aspect, the actions of blocks 1304 and 1306 may be performed by the bitonic network 1002 of FIG. 10 or the bitonic network 1100 of FIG. 11 (where the first switch settings may be applied to switches 1102 and the first randomly ordered list may be applied to inputs In1 to In8).

In block 1308, the process sorts the second randomly ordered list using a bitonic sort. In one aspect, the sort may be ascending. In one aspect, the sort may be descending. In one aspect, the sort may be a naturally order sort. In one aspect, the sort involves generating a naturally ordered list. In one aspect, the naturally ordered list includes the numbers from 0 to M−1 where M is the number of inputs to the bitonic network. In block 1310, the process determines settings of second switches used to achieve the bitonic sort, where the second switch settings define a cumulative control state (CCS). In one aspect, the actions of blocks 1308 and 1310 may be performed by the bitonic sorter 1004 of FIG. 10 or the bitonic sorter 1200 of FIG. 12 where the settings of the second switches correspond to the "c" output bits of the comparators (1206, 1208) of FIG. 12. In block 1312, the process determines a PBA of a non-volatile memory (NVM) to enable a data access of a corresponding LBA using the cumulative control state. In one aspect, the actions of block 1312 can be performed by the access network 202 of FIG. 2 or the access network 400 of FIG. 4. In one aspect, the NVM can be NVM 112 of FIG. 1.

Figure 14:
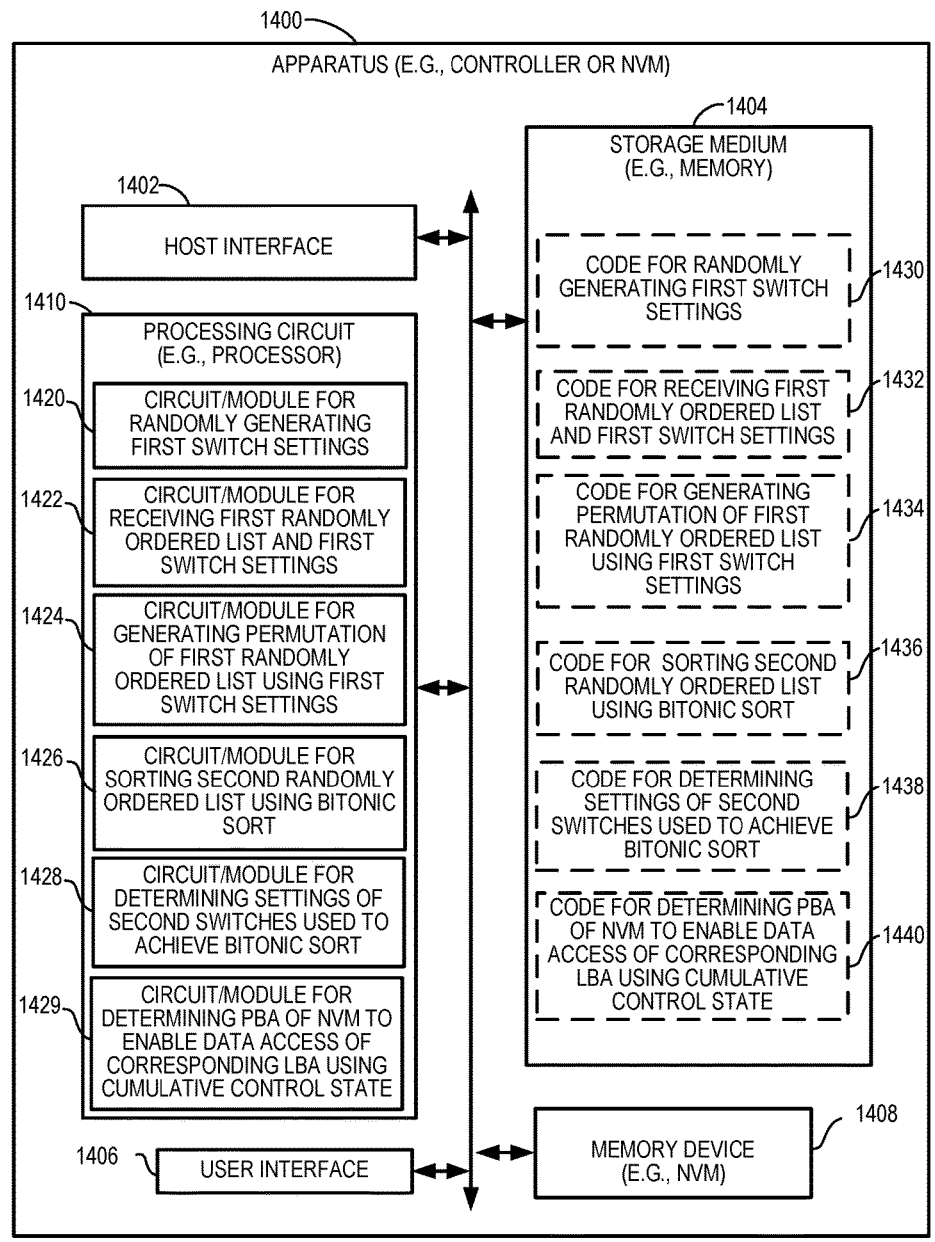
FIG. 14 is a block diagram of an example hardware implementation of an apparatus configured to determine cumulative control state for mapping LBAs to PBAs in accordance with one embodiment of the disclosure.

FIG. 14 is a block diagram of an example hardware implementation of an apparatus 1400 configured to determine cumulative control state for mapping LBAs to PBAs in accordance with one embodiment of the disclosure. The apparatus 1400 could embody or be implemented within a solid state drive, within an NVM, or some other type of memory device that supports wear leveling.

The apparatus 1400 includes a host interface (e.g., circuitry to communicate with a host or a controller) 1402, a storage medium 1404, a user interface 1406, a memory device (e.g., a memory circuit such as an NVM) 1408, and a processing circuit 1410 (e.g., at least one processor). In various implementations, the user interface 1406 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 14. The signaling bus may include any number of interconnecting buses and bridges depending on the specific application of the processing circuit 1410 and the overall design constraints. The signaling bus links together various circuits such that each of the host interface 1402, the storage medium 1404, the user interface 1406, and the memory device 1408 are coupled to and/or in electrical communication with the processing circuit 1410. The signaling bus may also link various other circuits (not shown) such as timing sources, peripherals, voltage regulators, and power management circuits, which are well known in the art, and therefore, will not be described any further.

The host interface 1402 provides a means for communicating with other apparatuses over a transmission medium. In one aspect, host interface 1402 may be implemented as host interface 106 of FIG. 1.

The memory device 1408 may represent one or more memory devices. In one aspect, the memory device 1408 may be implemented as an NVM, such as NVM 112 of FIG. 1. In one aspect, the memory device 1408 may contain production or user data. In some implementations, the memory device 1408 and the storage medium 1404 are implemented as a common memory component. The memory device 1408 may also be used for storing data that is manipulated by the processing circuit 1410 or some other component of the apparatus 1400.

The storage medium 1404 may represent one or more computer-readable, machine-readable, and/or processor-readable devices for storing programming, such as processor executable code or instructions (e.g., software, firmware), electronic data, databases, or other digital information. The storage medium 1404 may also be used for storing data that is manipulated by the processing circuit 1410 when executing programming. The storage medium 1404 may be any available media that can be accessed by a general purpose or special purpose processor, including RAMs, NVMs, portable or fixed storage devices, optical storage devices, and various other mediums capable of storing, containing or carrying programming. In one aspect, storage medium 1404 may be implemented as memory 110 of FIG. 1.

By way of example and not limitation, the storage medium 1404 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1404 may be embodied in an article of manufacture (e.g., a computer program product). By way of example, a computer program product may include a computer-readable medium in packaging materials. In view of the above, in some implementations, the storage medium 1404 may be a non-transitory (e.g., tangible) storage medium.

The storage medium 1404 may be coupled to the processing circuit 1410 such that the processing circuit 1410 can read information from, and write information to, the storage medium 1404. That is, the storage medium 1404 can be coupled to the processing circuit 1410 so that the storage medium 1404 is at least accessible by the processing circuit 1410, including examples where at least one storage medium is integral to the processing circuit 1410 and/or examples where at least one storage medium is separate from the processing circuit 1410 (e.g., resident in the apparatus 1400, external to the apparatus 1400, distributed across multiple entities, etc.).

Programming stored by the storage medium 1404, when executed by the processing circuit 1410, causes the processing circuit 1410 to perform one or more of the various functions and/or process operations described herein. For example, the storage medium 1404 may include operations configured for regulating operations at one or more hardware blocks of the processing circuit 1410, as well as to utilize the host interface 1402 for communication with a host utilizing their respective communication protocols.

The processing circuit 1410 is generally adapted for processing, including the execution of such programming stored on the storage medium 1404. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1410 is arranged to obtain, process and/or send data, control data access and storage, issue commands, and control other desired operations. The processing circuit 1410 may include circuitry configured to implement desired programming provided by appropriate media in at least one example. For example, the processing circuit 1410 may be implemented as one or more processors, one or more controllers, and/or other structure configured to execute executable programming Examples of the processing circuit 1410 may include a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1410 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1410 are for illustration and other suitable configurations within the scope of the disclosure are also contemplated.

According to one or more aspects of the disclosure, the processing circuit 1410 may be adapted to perform any or all of the features, processes, functions, operations and/or routines for any or all of the apparatuses described herein. For example, the processing circuit 1410 may be configured to perform any of the steps, functions, and/or processes described with respect to FIGS. 1-13, 15-30. As used herein, the term "adapted" in relation to the processing circuit 1410 may refer to the processing circuit 1410 being one or more of configured, employed, implemented, and/or programmed to perform a particular process, function, operation and/or routine according to various features described herein.

The processing circuit 1410 may be a specialized processor, such as an application-specific integrated circuit (ASIC) that serves as a means for (e.g., structure for) carrying out any one of the operations described in conjunction with FIGS. 1-13, 15-30. The processing circuit 1410 serves as one example of a means for performing the functions depicted therein. In various implementations, the processing circuit 1410 may incorporate the functionality of the controller 108 or NVM 112 (e.g., processor contained therein) of FIG. 1, the cumulative state computation block 204 or access network 202 of FIG. 2, the bitonic network 1002 or bitonic sorter 1004 of FIG. 10, the bitonic network 1100 of FIG. 11, or the bitonic sorter 1200 of FIG. 12.

According to at least one example of the apparatus 1400, the processing circuit 1410 may include one or more of a circuit/module for randomly generating first switch settings 1420, a circuit/module for receiving a first randomly ordered list and first switch settings 1422, a circuit/module for generating a permutation of the first randomly ordered list using the first switch settings 1424, a circuit/module for sorting a second randomly ordered list using a bitonic sort 1426, a circuit/module for determining settings of second switches used to achieve the bitonic sort 1428, or a circuit/module for determining a PBA of a non-volatile memory (NVM) to enable a data access of a corresponding LBA using the cumulative control state 1429.

In various implementations, the circuit/module for randomly generating first switch settings 1420, the circuit/module for receiving a first randomly ordered list and first switch settings 1422, the circuit/module for generating a permutation of the first randomly ordered list using the first switch settings 1424, the circuit/module for sorting a second randomly ordered list using a bitonic sort 1426, the circuit/module for determining settings of second switches used to achieve the bitonic sort 1428, or the circuit/module for determining a PBA of a non-volatile memory (NVM) to enable a data access of a corresponding LBA using the cumulative control state 1429 may correspond, at least in part, to the functionality of the controller 108 or NVM 112 (e.g., processor contained therein) of FIG. 1, the cumulative state computation block 204 or access network 202 of FIG. 2, the bitonic network 1002 or bitonic sorter 1004 of FIG. 10, the bitonic network 1100 of FIG. 11, or the bitonic sorter 1200 of FIG. 12.

As mentioned above, programming stored by the storage medium 1404, when executed by the processing circuit 1410, causes the processing circuit 1410 to perform one or more of the various functions and/or process operations described herein. For example, the programming, when executed by the processing circuit 1410, may cause the processing circuit 1410 to perform the various functions, steps, and/or processes described herein with respect to FIGS. 1-13, 15-30 in various implementations. As shown in FIG. 14, the storage medium 1404 may include one or more of code for randomly generating first switch settings 1430, code for receiving a first randomly ordered list and first switch settings 1432, code for generating a permutation of the first randomly ordered list using the first switch settings 1434, code for sorting the second randomly ordered list using a bitonic sort 1436, code for determining settings of second switches used to achieve the bitonic sort 1438, or code for determining a PBA of a non-volatile memory (NVM) to enable a data access of a corresponding LBA using the cumulative control state 1440.

In various implementations, the code for randomly generating first switch settings 1430, code for receiving a first randomly ordered list and first switch settings 1432, code for generating a permutation of the first randomly ordered list using the first switch settings 1434, code for sorting the second randomly ordered list using a bitonic sort 1436, code for determining settings of second switches used to achieve the bitonic sort 1438, or code for determining a PBA of a non-volatile memory (NVM) to enable a data access of a corresponding LBA using the cumulative control state 1440 may be executed or otherwise used to provide the functionality described herein for the circuit/module for circuit/module for randomly generating first switch settings 1420, the circuit/module for receiving a first randomly ordered list and first switch settings 1422, the circuit/module for generating a permutation of the first randomly ordered list using the first switch settings 1424, the circuit/module for sorting a second randomly ordered list using a bitonic sort 1426, the circuit/module for determining settings of second switches used to achieve the bitonic sort 1428, or the circuit/module for determining a PBA of a non-volatile memory (NVM) to enable a data access of a corresponding LBA using the cumulative control state 1429.

Local Address Mapping Using Pre-Stored Control States

Figure 15:
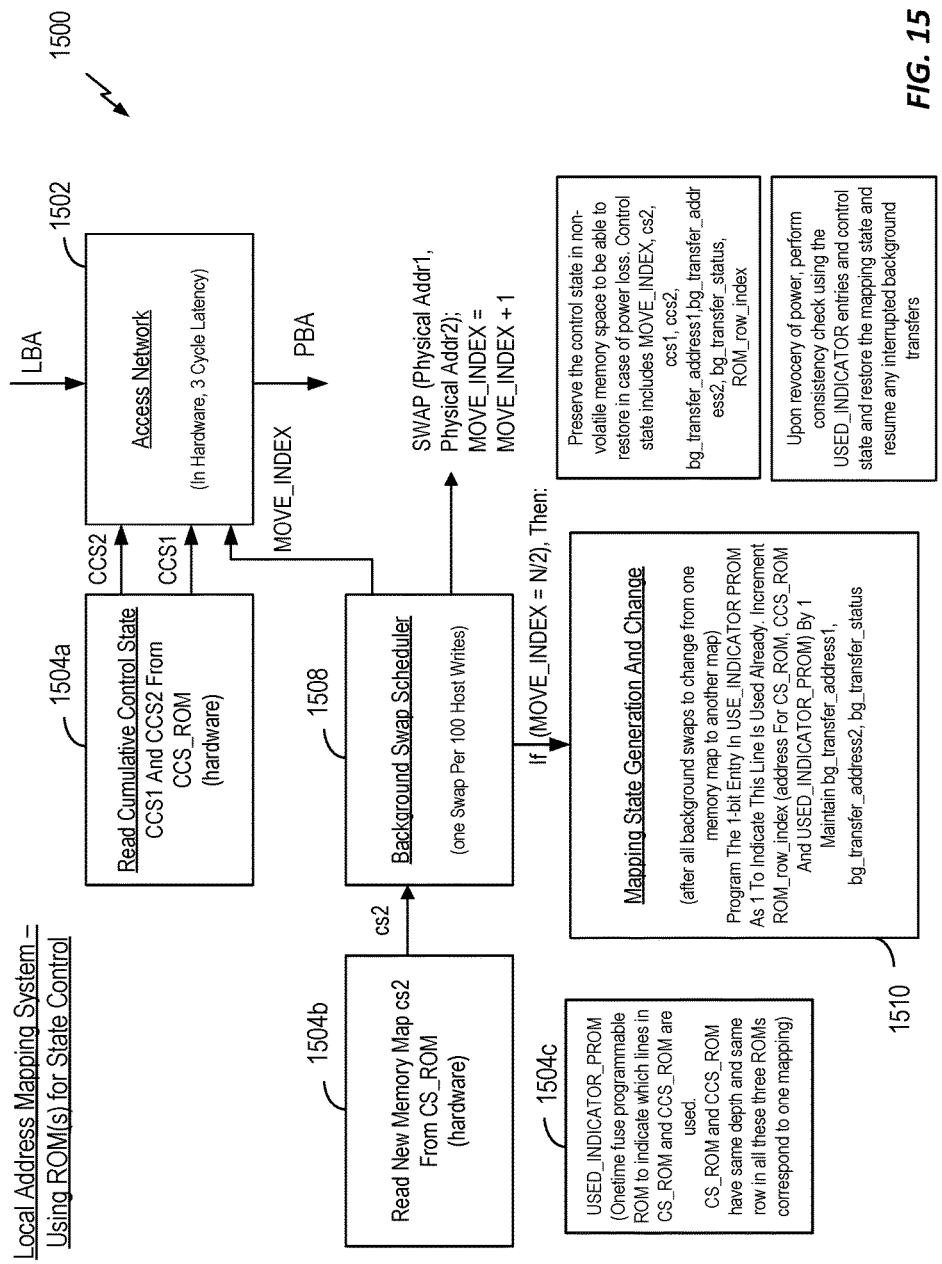
FIG. 15 is a block diagram of another system for local address mapping including an access network and one or more read-only memories (ROMs) for storing pre-calculated cumulative state values in accordance with one embodiment of the disclosure.
Figure 16:
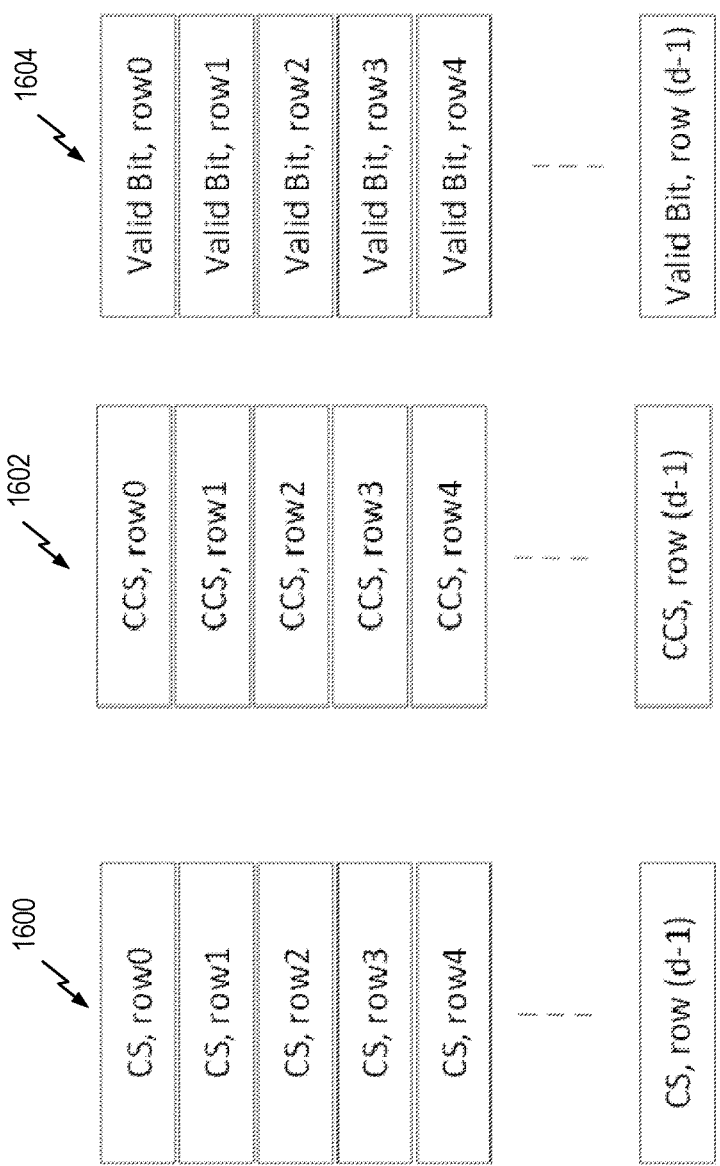
FIGS. 16a, 16b, 16c are schematic diagrams of ROMs for storing control state values, cumulative control state values, and use indicators that can be used in the system of FIG. 15 in accordance with one embodiment of the disclosure.

FIG. 15 is another block diagram of a system 1500 for local address mapping including an access network 1502 and one or more read-only memories (ROMs) (1504a, 1504b, 1504c) for storing pre-calculated cumulative control state values in accordance with one embodiment of the disclosure. The system 1500 further includes a background swap scheduler 1508 and a mapping state generation and change block 1510. In one aspect, the access network 1502 and ROMs (1504a, 1504b, 1504c) can be implemented in hardware (e.g., ultra-low latency with 3 cycle pipeline delay with low logic and memory equivalent of less than 10,000 logic gates) and the remaining components of the system 1500 can be implemented in firmware. In operation, the blocks of system 1500 can operate similar to those of system 200 of FIG. 2. A primary difference however in system 1500 is that the cumulative state is computed offline using a master bitonic network, or other suitable network, and then stored (e.g., in a table) in the ROMs (1504a, 1504b, 1504c). In one aspect, this approach can involve using a small amount of additional memory as compared to the system of FIG. 2.

Block 1504a represents a non-volatile memory (e.g., ROM such as CCS_ROM) storing the CCS values (e.g., CCS1 and CCS2). Block 1504b represents a non-volatile memory (e.g., ROM such as CS_ROM) storing the CS values (e.g., cs1 and cs2). Block 1504c represents a non-volatile memory (e.g., programmable ROM such as USE_PROM) effectively storing which lines in the CS_ROM and CCS_ROM are being used in case there is a loss of power. Effectively, the USE_PROM can be used to preserve the control state in a non-volatile memory space to restore in case of power loss. The control state values stored can include MOVE_INDEX, cs2, ccs1, ccs2, bg_transfer_address1, bg_transfer_address2, bg_transfer_status, and/or ROM_row_index. In one aspect and upon recovery of power, the system 1500 can perform a consistency check using the USE_PROM (e.g., use indicator) entries and control state and restore the mapping state and resume any interrupted background transfers.

FIGS. 16a, 16b, 16c are schematic diagrams of ROMs for storing control state values, cumulative control state values, and use indicators that can be used in the system of FIG. 15 in accordance with one embodiment of the disclosure.

FIG. 16a is a schematic diagram of a ROM (CS_ROM) 1600 that can be used to store control state (CS) values used in the system of FIG. 15 in accordance with one embodiment of the disclosure. FIG. 16a illustrates one possible implementation of a non-volatile memory that can be used to store control state values. In another aspect, other implementations can also be used.

FIG. 16b is a schematic diagram of a ROM (CCS_ROM) 1602 that can be used to store cumulative control state (CCS) values used in the system of FIG. 15 in accordance with one embodiment of the disclosure. FIG. 16b illustrates one possible implementation of a non-volatile memory that can be used to store cumulative control state values. In another aspect, other implementations can also be used.

FIG. 16c is a schematic diagram of a PROM (USE_PROM) 1604 that can be used to store control state (CS) values used in the system of FIG. 15 in accordance with one embodiment of the disclosure. More specifically, the USE_PROM 1604 can be used to store index or placeholder information relating to current positions in the CS_ROM and CCS_ROM in a non-volatile memory space to restore in case of power loss. FIG. 16c illustrates one possible implementation of a non-volatile memory that can be used to store index information into the ROMs. In another aspect, other implementations can also be used.

In one aspect, the system 1500 of FIG. 15 can increment a ROM_row_index by 1 every time a mapping gets used, where ROM_row_index can be the address for CS_ROM, and CCS_ROM. The system can also program a 1-bit entry in USE_PROM as 1 to indicate this line is used already.

Figure 17:
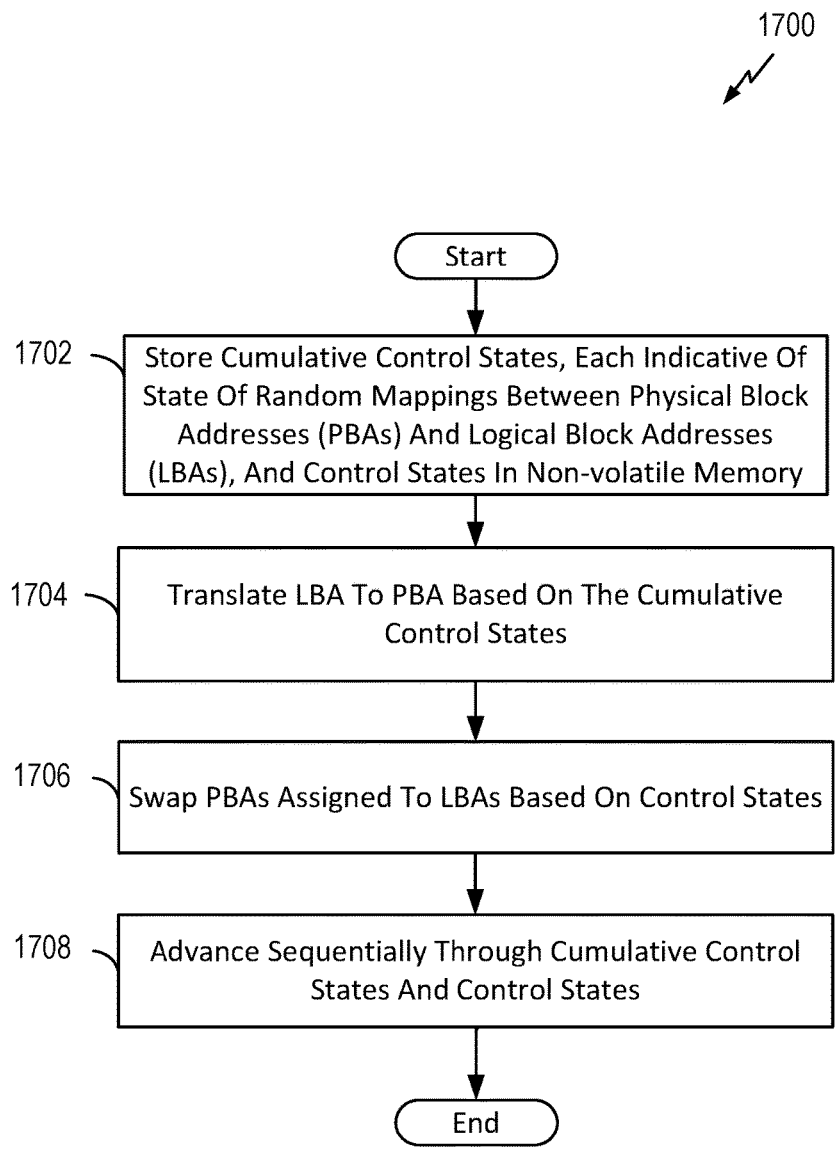
FIG. 17 is a flow chart of a process for wear leveling in accordance with one embodiment of the disclosure.

FIG. 17 is a flow chart of a process 1700 for wear leveling in accordance with one embodiment of the disclosure. In one embodiment, the process 1700 can be performed by the wear leveling system 1600 of FIG. 16, or any of the other wear leveling systems described herein.

In block 1702, the process stores a plurality of cumulative control states, each indicative of a state of random mappings between physical block addresses (PBAs) and logical block addresses (LBAs), and a plurality of control states in a non-volatile memory. In certain aspects, the actions of block 1702 may be effectuated with the controller 108, or with the controller 108 in combination with the host 102 as illustrated in FIG. 1. In certain aspects, block 1702 may be effectuated with the wear leveling system 1600 of FIG. 16, including ROM 1604a, ROM 1604b, ROM 1604c, other ROMs in FIG. 16, the controller 108 of FIG. 1, and/or any combination of those components. In one aspect, block 1702 may be effectuated with ROM 1604a, ROM 1604b, and/or controller 108.

In block 1704, the process translates a logical block address (LBA) to a physical block address (PBA) based on the plurality of cumulative control states. In certain aspects, the actions of block 1704 may be effectuated with the controller 108, or with the controller 108 in combination with the host 102 as illustrated in FIG. 1. In certain aspects, block 1704 may be effectuated with the wear leveling system 1600 of FIG. 16, including the access network 1602, the controller 108 of FIG. 1, and/or any combination of those components. In one aspect, block 1704 may be effectuated with the access network 1602.

In block 1706, the process swaps PBAs assigned to preselected LBAs based on the plurality of control states. In certain aspects, the actions of block 1706 may be effectuated with the controller 108, or with the controller 108 in combination with the host 102 as illustrated in FIG. 1. In certain aspects, block 1706 may be effectuated with the wear leveling system 1600 of FIG. 16, including the background swap scheduler 1608, the controller 108 of FIG. 1, and/or any combination of those components. In one aspect, block 1706 may be effectuated with the background swap scheduler 1608.

In one aspect, the cumulative control state includes a first cumulative control state and a second cumulative control state, where the control state includes a first control state and a second control state, and where the second cumulative control state is a function of the first cumulative control state and the second control state. The cumulative control states (e.g., CCS1 and CCS2) and control states (e.g., cs1, cs2) are described in more detail above with respect to FIG. 2, and below with respect to FIG. 12.

In one aspect, the process may further include changing from a first memory map to a second memory map after swapping a preselected number of PBAs, where the first memory map and the second memory map each include a preselected number of PBAs. In one aspect, this may be performed by the mapping state block 1610 of FIG. 16.

In one aspect, the swapping of PBAs assigned to preselected LBAs based on the control state includes swapping PBAs after a preselected number of accesses of a non-volatile memory of the non-volatile memory system. In one aspect, the preselected number of accesses can be 100 writes of the non-volatile memory.

In one aspect, the process 1700 further includes generating a first PBA candidate from a LBA using a first function, generating a second PBA candidate from the LBA using a second function, and selecting either the first PBA candidate or the second PBA candidate for data access based on information related to a background swap of data stored at the first PBA candidate and a background swap of data stored at the second PBA candidate. In one aspect, these actions may be performed by the access network 1602 of FIG. 16 or the access network 400 of FIG. 4. In one aspect, at least one of the first function or the second function includes a function performed by at least one of a multi-stage interconnection network or a block cipher. In one aspect, the second cumulative control state reflects switch settings used to achieve a sort of a permutation of the first cumulative control state where the permutation is generated using the second control state.

Figure 18:
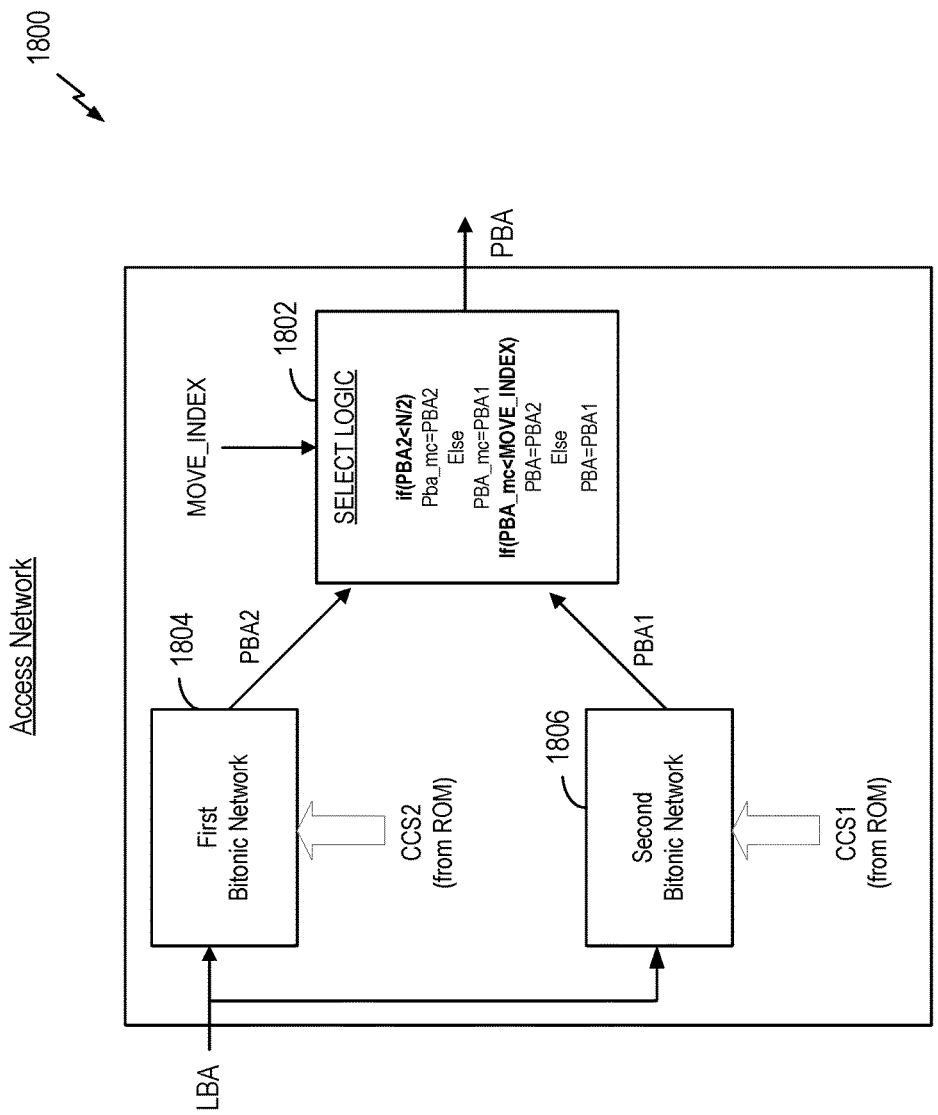
FIG. 18 is a block diagram of another access network, including a select logic block that can be used in the address mapping system of FIG. 15, to map a LBA to a PBA in accordance with one embodiment of the disclosure.

FIG. 18 is a block diagram of another access network 1800 including a select logic block 1802 that can be used in the address mapping system of FIG. 15 in accordance with one embodiment of the disclosure. In one aspect, the access network 1800 can be used in the system of FIG. 15 as access network 1502. The system 1800 further includes a first bitonic network 1804 and a second bitonic network 1806. The system 1800 can operate substantially the same as system 400 of FIG. 4 except that the cumulative control state values (CCS1, CCS2) are received from the ROMs (e.g., 1504a, 1504b, 1504c) rather than from an online cumulative control state block such as block 204 of FIG. 2.

The systems and methods for performing local address mapping described above may be used in conjunction with wear leveling schemes employing random address mapping using local and global interleaving. The following section describes such approaches.

Local/Global Interleaving

Figure 19:
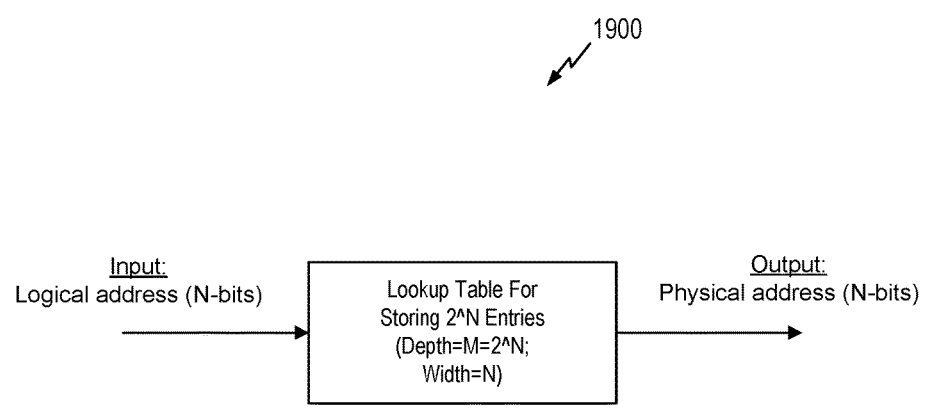
FIG. 19 is a block diagram of indirection table in accordance with one embodiment of the disclosure.

FIG. 19 is a block diagram of indirection table 1900 in accordance with one embodiment of the disclosure. For example, in a drive with M pages/sectors, the indirection table has M entries as is depicted in FIG. 19. In such case, each entry is N bits where N is log 2(M). For a 2 TB drive with 512 byte pages, $M=2\times10^{12}B/512B=3.9\times10^9$ and thus N is equal to 32. As such, the memory required in bits for the table would be M×log 2M=125 GB (~15 GB). The frequency of use table would also consume similar space (~15 GB). So the total requirement would be around 30 GB for this meta data. In some implementations, the meta data may have to be replicated with two plus one redundancy, thereby increasing the complexity up to 90 GB. In such case, this memory usage amounts to around 4.5% of disk space. So this sort of approach would generally not be practical.

Figure 20:
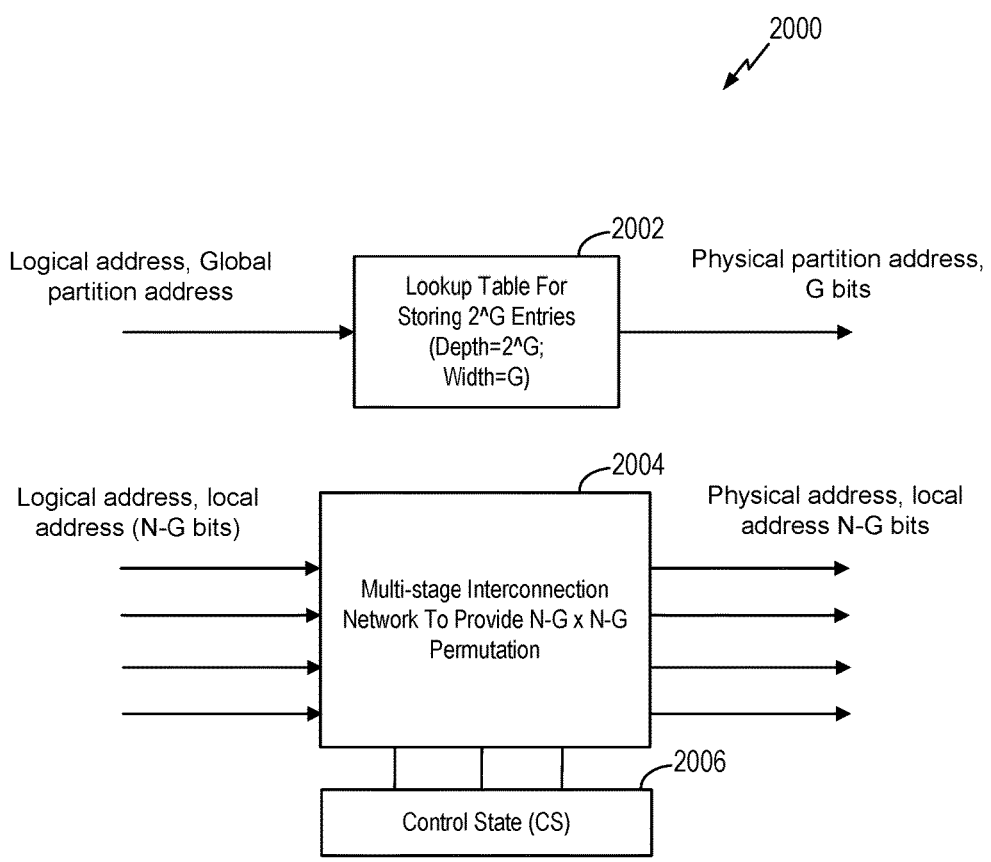
FIG. 20 is a block diagram of a general system for performing random address mapping using local and global interleaving in accordance with one embodiment of the disclosure.

FIG. 20 is a block diagram of a general system for performing random address mapping using local and global interleaving in accordance with one embodiment of the disclosure. The system 2000 includes a lookup table 2002 that can be used to store $2^G$ entries with a depth of $2^G$ and a width of G. The system 2000 also includes a multi-stage interconnection network (MIN) 2004 that can be used to provide permutations of data sets, and a control state block 2006 that can be used to control the MIN 2004. The system 2000 illustrates a general framework for mapping an N-bit logical address space to N-bit physical space by first dividing the address bits into G bits and N−G bits. In general, any G bits out of the N bits can be selected using another fixed network. In this context, a fixed network can simply be a fixed arrangement of wires to arrive at a specific network. As compared to a multi-stage programmable interconnection network, the fixed network may not have programmability. For simplicity, the G bits selected are the most significant bits (MSBs) of the N bits. So the system can perform mapping on $2^G$ entries in block 2002, and perform bit permutation on N−G bits in block 2004. The G bits can be mapped using a $2^G$ entry mapping table 2002. In one aspect, the mapping can be performed such that there is one-to-one unique mapping and the input is not equal to the output. Also, in one aspect, G is selected such that $1<=G<=N$. In one aspect, the case of $G<=6$ may be of particular interest. If G=N, then this case can be equivalent to the conventional mapping table approach.

In one embodiment, the global mapping can satisfy one or more properties. For example, in one aspect, the global mapping can be a one to one function. In another aspect, the global mapping can be performed such that the input is not equal to the output. In another aspect, a swap can be performed such that a global mapping of a number (k) is equal to kk, while a global mapping of kk is equal to k. So suitable functions for global mapping may include bit inverse mapping, random swap, deterministic swap, and other suitable functions. Bit inverse mapping can be chosen for a simple hardware implementation. If a table is used, the maximum size of the table needed can be $2^G$ entries with each entry having a width of G bits. Since G is not more than 7 in this example, the table approach is also suitable.

In one embodiment, the local mapping can satisfy one or more properties. For example, in one aspect, the local mapping can be a one to one function. So suitable functions for local mapping may include deterministic mapping and/or random mapping. In one aspect, random mapping may be selected. Deterministic or random mapping may be implemented using tables or an Omega network, a Butterfly network, a Benes network, or another suitable network. In one aspect, a Benes network (e.g., such as a master-slave Benes network) is selected as it has the lowest complexity for computing the switch state required. In this network, a bitonic sorting can be implemented on master Benes network on sequences with certain properties to derive the switch state for slave Benes network. In one embodiment, the local address mapping can be performed using any of the local address mapping schemes described above in conjunctions with FIGS. 1-18.

In one embodiment, a wear leveling algorithm implemented with the random address mapping can involve operating in an address space, set partitioning the address space, and local and global interleaving in the address space. In one aspect, the wear leveling algorithm can involve gradual deterministic transition from one memory map to another memory map.

Figure 21:
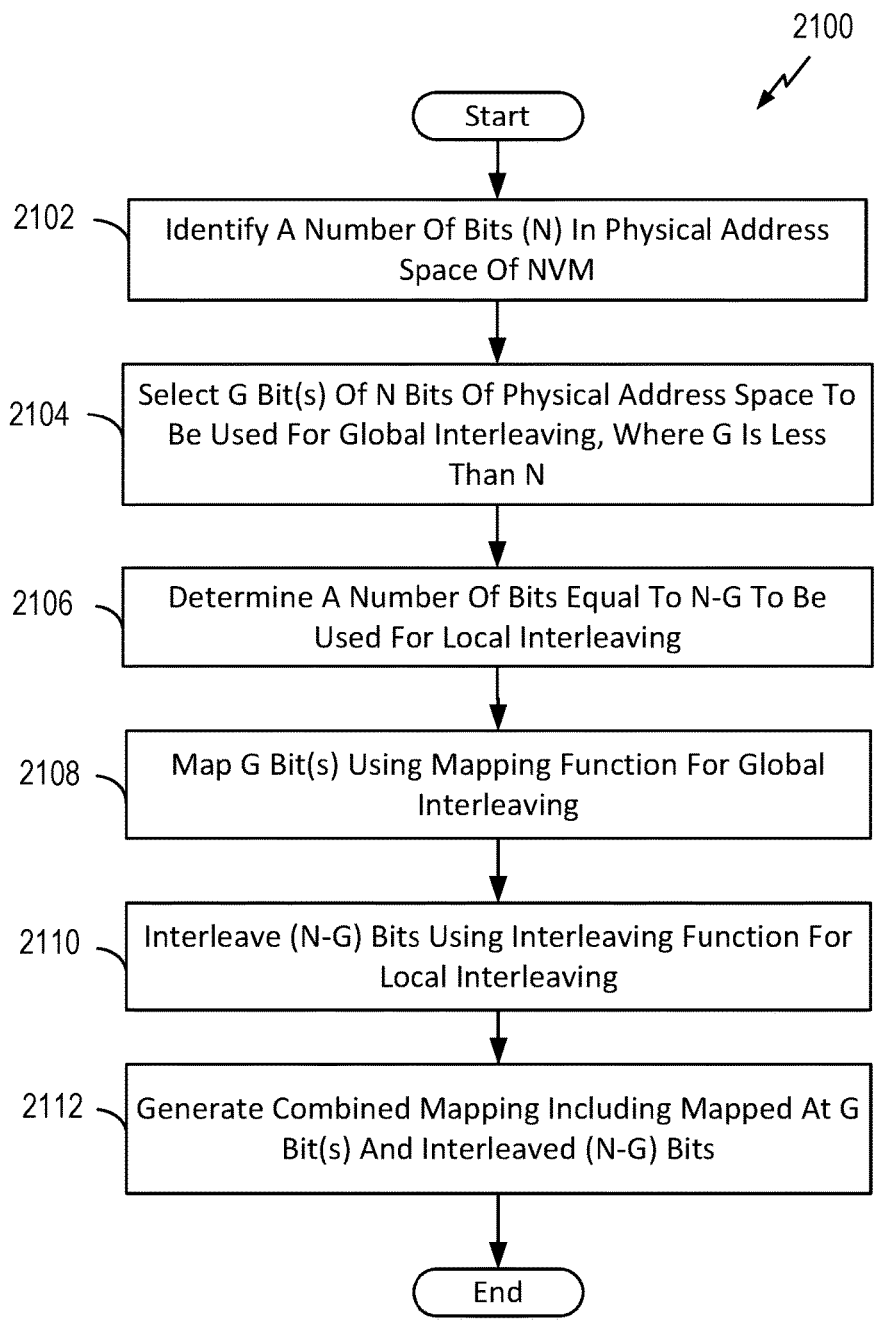
FIG. 21 is a flow chart of a process for performing random address mapping using global mapping and local interleaving in accordance with one embodiment of the disclosure.

FIG. 21 is a flow chart of a process for performing random address mapping using global mapping and local interleaving in accordance with one embodiment of the disclosure. In one embodiment, the process can be used for wear leveling or other random address mapping in any of the random mapping systems described herein. In block 2102, the process identifies a number of bits (N) in a physical address space of a non-volatile memory (NVM). In block 2104, the process selects at least one bit (G) of the N bits of the physical address space to be used for global interleaving, where G is less than N. In block 2106, the process determines a number of bits equal to N minus G (N–G) to be used for local interleaving.

In block 2108, the process maps the G bit(s) using a mapping function for global interleaving. In one embodiment, the mapping function can be a bit inverse mapping function, a random swap mapping function, a deterministic swap mapping function, and/or another suitable mapping function.

In block 2110, the process interleaves (N–G) bits using an interleaving function for local interleaving. In one embodiment, the interleaving function can be a deterministic interleaving function, a random interleaving function, and/or another suitable interleaving function. In one embodiment, the interleaving function can be implemented using an Omega network, a Butterfly network, a Benes network, a master-slave Benes network, and/or another suitable interleaving function.

In some embodiments, the mapping function for the global interleaving is a bit inverse mapping function, and the interleaving function is implemented using a master-slave Benes network. In one such embodiment, the G bit(s) are the most significant bit(s) of the physical address space of the NVM, and the bit inverse mapping function involves inversing each of the G bit(s).

In block 2112, the process generates a combined mapping including the mapped G bit(s) and the interleaved (N–G) bits. In one embodiment, the combined mapping constitutes a mapped physical address (see for example column 2506 in FIG. 25 as will be discussed in more detail below).

Figure 22:
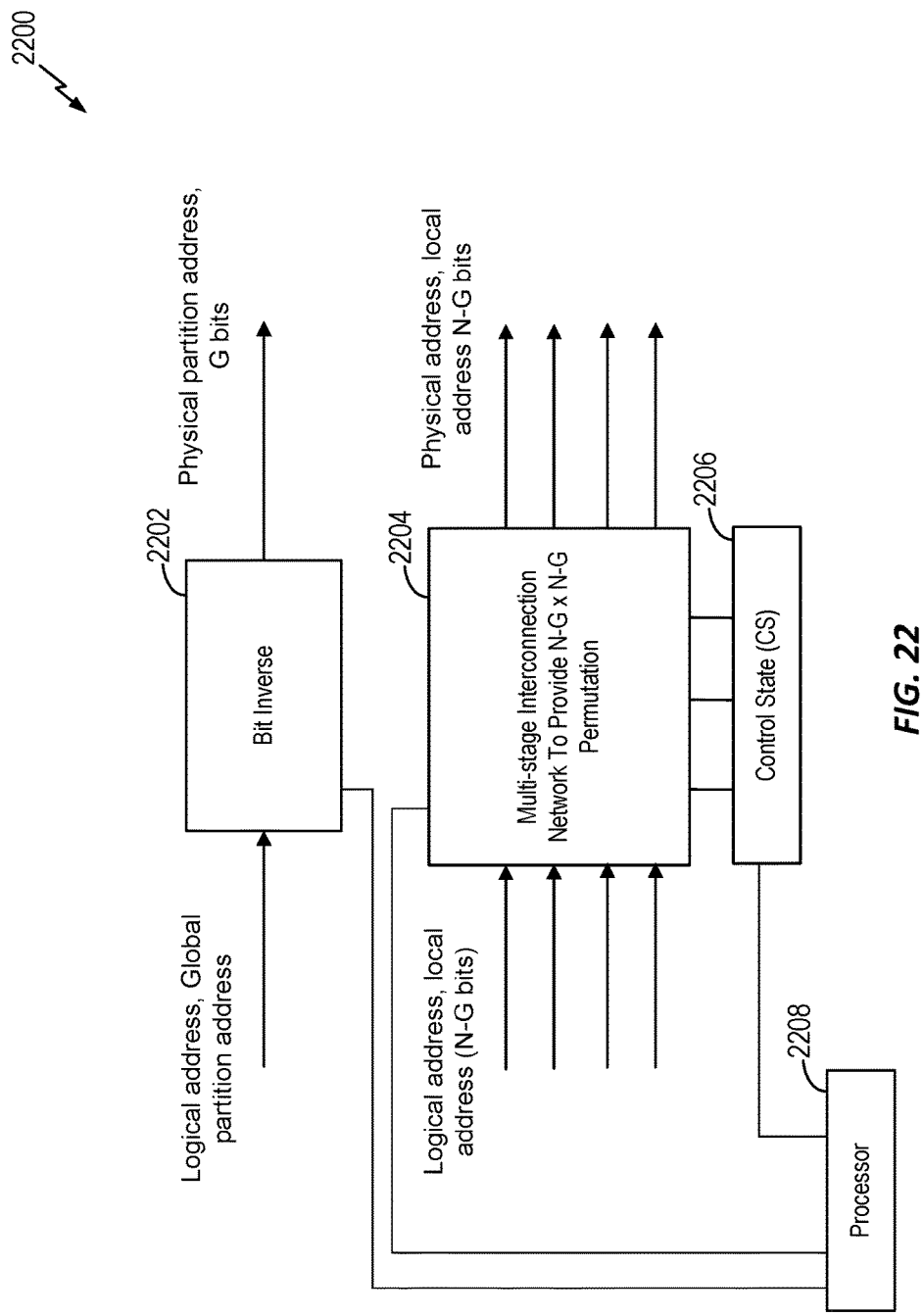
FIG. 22 is a block diagram of a system for performing random address mapping with bit inverse for global mapping (G bits) and permutation for local interleaving (N–G bits) in accordance with one embodiment of the disclosure.

FIG. 22 is a block diagram of a system for performing random address mapping with bit inverse for global mapping (G bits) and permutation for local interleaving (N–G bits) in accordance with one embodiment of the disclosure. The system 2200 includes a bit inverse block 2202 that can be used to inverse selected bits of the logical address. In one aspect, for example, the bit inverse block 2202 can be used to map G bits using a mapping function for global interleaving as is described in block 2108 of FIG. 21, where the mapping function is a bit inversing function. The system 2200 also includes a multi-stage interconnection network (MIN) 2204 that can be used to provide permutations of data sets, such as permutations of selected bits of the logical address. In one aspect, the MIN 2204 can be used to interleave N–G bits using an interleaving function for local interleaving as is described in block 2110 of FIG. 21. The system 2200 also includes a control state block 2206 that can be used to control the MIN 2204.

The system 2200 further includes a processor 2208 which can be used to control and/or perform computations for the bit inverse block 2202 and the MIN 2204. In this context, processor 2208 refers to any machine or selection of logic that is capable of executing a sequence of instructions and should be taken to include, but not limited to, general purpose microprocessors, special purpose microprocessors, central processing units (CPUs), digital signal processors (DSPs), application specific integrated circuits (ASICs), signal processors, microcontrollers, and other suitable circuitry. Further, it should be appreciated that the term processor, microprocessor, circuitry, controller, and other such terms, refer to any type of logic or circuitry capable of executing logic, commands, instructions, software, firmware, functionality, or other such information. In one aspect, the processor 2208 can be used to identify a number of bits (N) in a physical address space of a non-volatile memory (NVM) as is described in block 2102 of FIG. 21, select at least one bit (G) of the N bits of the physical address space to be used for global interleaving, where G is less than N as is described in block 2104 of FIG. 21, and/or determine a number of bits equal to N minus G (N–G) to be used for local interleaving as is described in block 2106 of FIG. 21. In one aspect, the processor 2208 can also be used to generate a combined mapping including the mapped G bit(s) and the interleaved (N–G) bits as is described in block 2112 of FIG. 21. In one embodiment, the combined mapping is instead generated by block 2202 and/or block 2206.

In one simple example to illustrate the address space operations, and as depicted in FIG. 22, assume the number of pages (M) in the NVM is 16 (i.e., M=16 pages). In such case, the number of address bits (N) can be computed as N=log 2(M)=4 address bits. In such case, the parameters of the configuration would be as follows: G=1(2^G partitions), L=N–G=4–1=3(3×3 network). This simple example will be carried through FIGS. 23 to 25.

FIG. 23 is a table 2300 illustrating an example of global mapping using bit inverse on G bits in accordance with one embodiment of the disclosure. In one aspect, the table 2300 of FIG. 23 can be viewed as an example of the global mapping shown in block 2202 of FIG. 22. In the continuing simple example, G is 1 bit (i.e., the most significant bit (MSB) of the 4 address bits). In the example of FIG. 23, the table 2300 illustrates the initial addresses in the left column, shown in both decimal and binary. The table 2300 also illustrates the final addresses, after global mapping using bit inverse on the G bits (i.e., the MSB), in the right column of addresses, shown in both decimal and binary. As can be seen in FIG. 23, the global mapping using bit inverse is a one to one function, and the input is not equal to the output. This implementation is consistent with one or more of the possible design characteristics discussed above.

Figure 24:
FIG. 24 is a table illustrating a numerical example of local interleaving using a permutation on N–G bits in accordance with one embodiment of the disclosure.

FIG. 24 is a table 2400 illustrating an example of local interleaving using a permutation on N–G bits in accordance with one embodiment of the disclosure. More specifically, for the local interleaving of address bits, assume the 3 address bits ([x2 x1 x0]) are permuted to [x2 x0 x1]. In the example of FIG. 24, the table 2400 illustrates the initial addresses in the left column, shown in both decimal and binary. The table 2400 also illustrates the final addresses, after local mapping using the selected permutation, in the right column of addresses, shown in both decimal and binary. As can be seen in FIG. 24, the local interleaving using permutation is a one to one function. This implementation is consistent with one or more of the possible design characteristics discussed above. In one aspect, the table 2400 of FIG. 24 can be viewed as an example of the local interleaving as shown in block 2204 of FIG. 22.

FIG. 25 is a table 2500 illustrating an example of global mapping using bit inverse and local interleaving using permutation in accordance with one embodiment of the disclosure. The left most column 2502 shows the original addresses in decimal. The middle column 2504 shows the effect of global mapping/interleaving only and matches the final column (e.g., results) of FIG. 23. The right most column 2506 shows the resulting physical addresses with both the global mapping using bit inverse and the local interleaving using a selected permutation. This simple example illustrates one possible operation of the systems and methods of FIGS. 20-22. More specifically, the table 2500 of FIG. 25 can be viewed as an example of the combined mapping that can be generated by any combination of the processor 2208, block 2202 and 2204 of FIG. 22.

Figure 26:
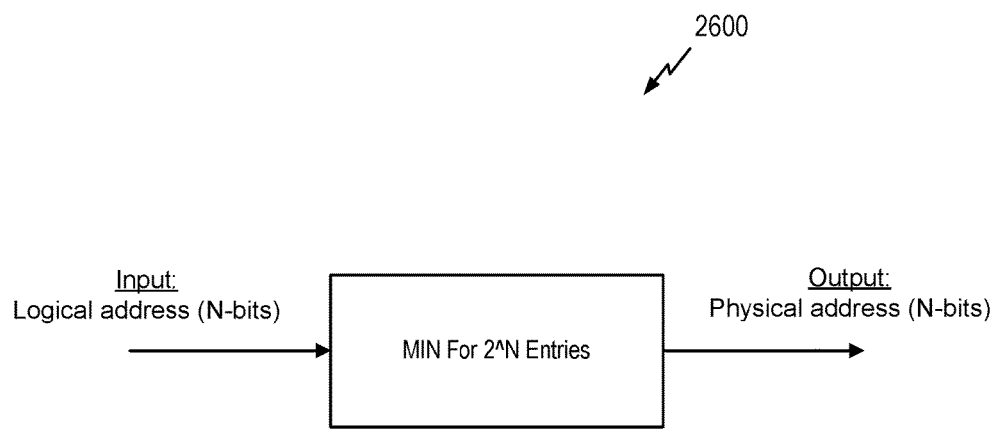
FIG. 26 is a block diagram of a multi-stage interconnection network (MIN) that can be used to perform local interleaving in accordance with one embodiment of the disclosure.

FIG. 26 is a block diagram of a multi-stage interconnection network (MIN) 2600 that can be used to perform local interleaving (e.g., block 2204 in FIG. 22) in accordance with one embodiment of the disclosure. This MIN approach (e.g., multi-stage interconnection network or MIN with 2^N entries) for generating random mapping from logical space and physical space is may be expensive to implement as the storage size can be large.

More specifically, in one aspect, moving items has to be done based on a certain order defined by mapping. For a read process, to differentiate which chip select (CS) has to be used, another table of 2^N entries and each entry width needs to be maintained. In contrast, the CS chip storage is equal to log 2(N)*N/2 for an Omega network and log 2(N)*N for a Benes network.

Figure 27:
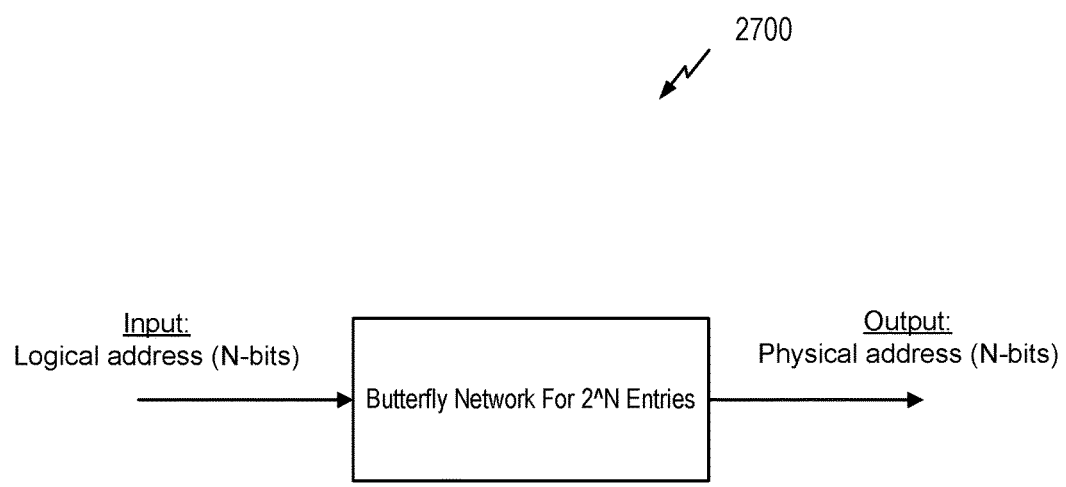
FIG. 27 is a block diagram of a butterfly MIN that can be used to perform local interleaving in accordance with one embodiment of the disclosure.

FIG. 27 is a block diagram of a butterfly MIN 2700 that can be used to perform local interleaving in accordance with one embodiment of the disclosure. This MIN approach (e.g., butterfly MIN on 2^N entries) for generating random mapping from logical space and physical space is a suitable multi-stage interconnection network that may be used, for example, for the MIN 2204 of FIG. 22 or the MIN 2004 of FIG. 20.

For the trivial case of shuffle equal to 1 for the physical address space, the network is not needed as it is easy to figure out the mapping. In this context, an address shuffle can be defined as a left cyclic shift of the physical address, which is a binary string. Consider for example stages 1 to M. At stage k, the physical address of a logical address is given by (xn−1, xn−2, xn−3, xn−k, x1, x0) is converted to (via inverse) (Xn−1, Xn−2, Xn−3, Xn−k−1, x1, x0). In one aspect, another simpler case may include a butterfly permutation where the MSB is swapped with the LSB, a substitution permutation where any ith bit is swapped with bit 0 (e.g., the LSB), and a super permutation where any ith bit is swapped with the MSB. In another aspect, the local interleaving may involve using any switch combination for each stage.

In general, a MIN may be used in one of two modes. For example, in a routing mode, the switches in MIN are configured to realize the desired mapping from input ports to output ports in one or more passes. In such case, each input port takes a multi-bit (say m-bit) word and each output port gives a m-bit word, and there are N inputs and N outputs. In a second mode, an interleaving mode, the switches in MIN are configured using a random seed. This results in a random mapping from input ports to output ports in a single pass. In several aspects, the interleavers and/or interleaving described herein can use a MIN in the interleaving mode to interleave preselected bits in a desired manner.

Figure 28:
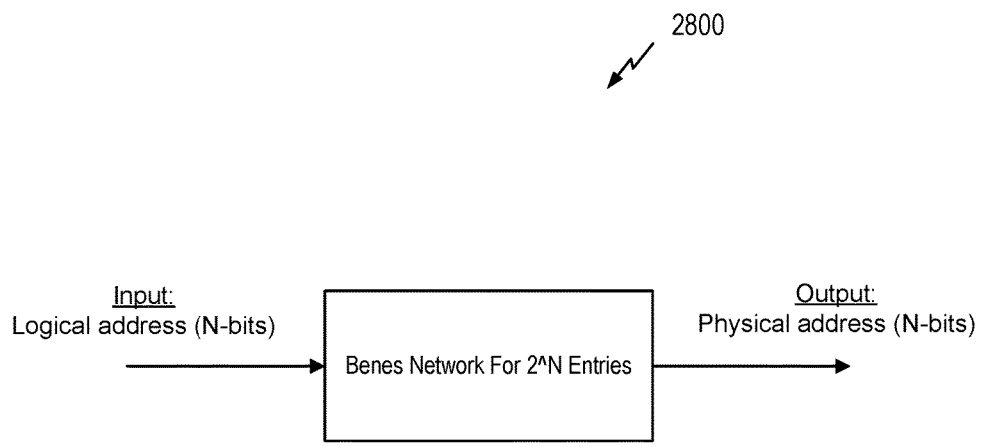
FIG. 28 is a block diagram of a Benes MIN that can be used to perform local interleaving in accordance with one embodiment of the disclosure.

FIG. 28 is a block diagram of a Benes MIN 2800 that can be used to perform local interleaving in accordance with one embodiment of the disclosure. This MIN approach (e.g., Benes MIN on 2^N entries) for generating random mapping from logical space and physical space is a suitable multi-stage interconnection network that may be used, for example, for the MIN 2204 of FIG. 22 or the MIN 2004 of FIG. 20.

Figure 29:
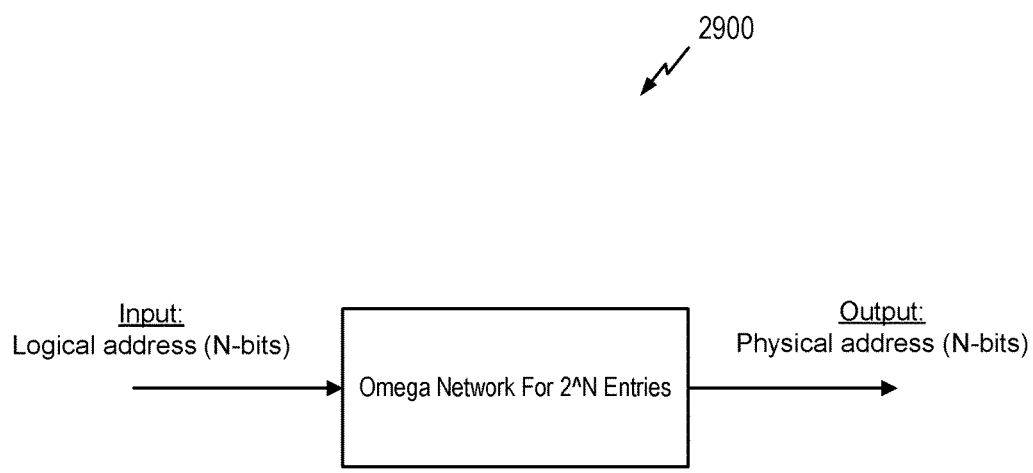
FIG. 29 is a block diagram of a Omega MIN that can be used to perform local interleaving in accordance with one embodiment of the disclosure.

FIG. 29 is a block diagram of a Omega MIN 2900 that can be used to perform local interleaving in accordance with one embodiment of the disclosure. This MIN approach (e.g., Omega MIN on 2^N entries) for generating random mapping from logical space and physical space is a suitable multi-stage interconnection network that may be used, for example, for the MIN 2204 of FIG. 22 or the MIN 2004 of FIG. 20. In one aspect, the Omega network may only be able to provide a subset of all possible permutations of switching while the Benes network may be able provide all possible permutations. In one aspect, if a desired permutation is required, it may be difficult to solve chip select settings for the Benes network. To counter this potential issue, one implementation of the Benes network involves randomly setting the chip select settings, which can make the chip select algorithm much simpler. That is, the randomly generated chip select settings reduce computing time requirements and/or computing challenges needed to solve the chip select settings.

Figure 30:
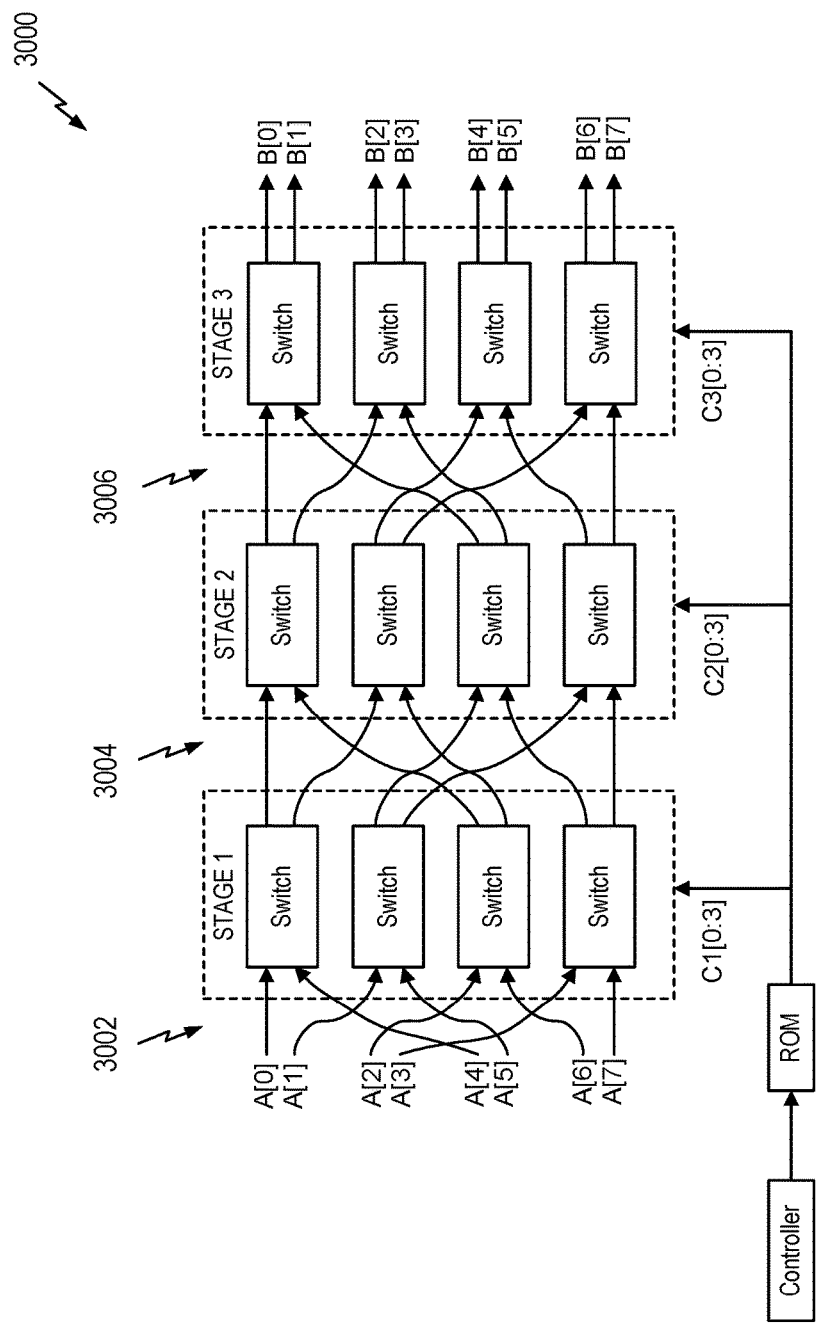
FIG. 30 shows a block diagram of a modified Omega MIN that can be used to perform local interleaving in accordance with one embodiment of the disclosure.

FIG. 30 shows a block diagram of a modified (8×8) Omega MIN 3000 that can be used to perform local interleaving in accordance with one embodiment of the disclosure. In general, Omega networks are (N×N) multistage interconnection networks that are sized according to integer powers of two. Thus, Omega networks have sizes of N=2, 4, 8, 16, 32, 64, 128, etc. Further, the number L of stages in an Omega network is equal to log 2(N) and the number of (2×2) switches per stage is equal to N/2.

Omega network 3000 is an (8×8) network that receives eight input values at eight input terminals A[0:7] and maps the eight input values to eight output terminals B[0:7]. Each input value may be any suitable value such as a single bit, a plurality of bits, a sample, or a soft value (such as a Viterbi log-likelihood ratio (LLR) value) having a hard-decision bit and at least one confidence-value bit. The eight input values are mapped to the eight output terminals using log 2(8)=3 configurable stages i, where i=1, 2, 3, each of which comprises 8/2=4 (2×2) switches.

Each stage i receives the eight input values from the previous stage, or from input terminals A[0:7] in the case of stage 1, via a fixed interconnection system (e.g., 3002, 3004, and 3006) that implements a perfect shuffle on the eight input values. A perfect shuffle is a process equivalent to (i) dividing a deck of cards into two equal piles, and (ii) shuffling the two equal piles together in alternating fashion such that the cards in the first pile alternate with the cards from the second pile.

For example, stage 1 receives eight inputs values from input terminals A[0:7] via fixed interconnection system 3002. Fixed interconnection system 3002 performs a perfect shuffle on the eight input values by dividing the eight input values received at input terminals A[0:7] into a first set corresponding to input terminals A[0:3] and a second set corresponding to input terminals A[4:7]. Similarly, fixed interconnection system 3004 performs a perfect shuffle on the outputs of switches from stage 1 and provides the shuffled outputs to the switches of stage 2, and fixed interconnection system 3006 performs a perfect shuffle on the outputs of the switches of stage 2 and provides the shuffled outputs to the switches of stage 3.

In addition to receiving eight input values, each configurable stage i receives a four-bit control signal Ci[0:3] from control signal memory (e.g., ROM), wherein each bit of the four-bit control signal configures a different one of the four 2×2 switches in the stage. Thus, the switches of stage 1 are configured based on the values of control bits C1[0], C1[1], C1[2], and C1[3], the switches of stage 2 are configured based on the values of control bits C2[0], C2[1], C2[2], and C2[3], and the switches of stage 3 are configured based on the values of control bits C3[0], C3[1], C3[2], and C3[3].

Setting a control bit to a value of one configures the corresponding switch as a crossed connection such that (i) the value received at the upper input is provided to the lower output and (ii) the value received at the lower input is provided to the upper output. Setting a control bit to a value of zero configures the corresponding switch as a straight pass-through connection such that (i) the value received at the upper input is provided to the upper output and (ii) the value received at the lower input is provided to the lower output.

In signal-processing applications, multistage interconnection networks, such as Omega network 3000, are often used for routing purposes to connect processors on one end of the network to memory elements on the other end. However, multistage interconnection networks may also be used in signal-processing applications for other purposes, such as for permuting or interleaving a contiguous data stream.

FIG. 30 illustrates one implementation of a suitable Omega MIN configured for interleaving. In other embodiments, other implementations of a suitable Omega MIN can be used.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner Tasks or events may be added to or removed from the disclosed example embodiments. The example systems and components described herein may be configured differently than described. For example, elements may be added to, removed from, or rearranged compared to the disclosed example embodiments.

What is claimed is:

1. A non-volatile memory system configured for wear leveling, the system comprising:
    a first non-volatile memory configured to store information from a host;
    a second non-volatile memory storing a plurality of cumulative control states, each indicative of a state of random mappings between physical block addresses (PBAs) and logical block addresses (LBAs) of the first non-volatile memory, and a plurality of control states;
    an access network configured to translate LBAs to PBAs based on the plurality of cumulative control states;
    a background swap scheduler configured to swap PBAs assigned to LBAs based on the plurality of control states; and
    a controller configured to sequentially advance through the plurality of cumulative control states and the plurality of control states.

2. The system of claim 1, wherein the second non-volatile memory comprises a read only memory (ROM).

3. The system of claim 1:
    wherein the cumulative control state comprises a first cumulative control state and a second cumulative control state;
    wherein the control state comprises a first control state and a second control state; and
    wherein the second cumulative control state is a function of the first cumulative control state and the second control state.

4. The system of claim 3, wherein the second cumulative control state comprises switch settings used to achieve a sort of a permutation of the first cumulative control state where the permutation is generated using the second control state.

5. The system of claim 1, further comprising:
    a mapping state generator configured to change from a first memory map to a second memory map after the background swap scheduler swaps a preselected number of PBAs;
    wherein the first memory map and the second memory map each comprises a preselected number of PBAs.

6. The system of claim 1, wherein the background swap scheduler is configured to swap PBAs after a preselected number of accesses of the first non-volatile memory.

7. The system of claim 6, wherein preselected number of accesses comprises 100 writes of the first non-volatile memory.

8. The system of claim 1, wherein the access network is further configured to:
    generate a first PBA candidate from a LBA using a first function;
    generate a second PBA candidate from the LBA using a second function; and
    select either the first PBA candidate or the second PBA candidate for data access based on information related to a background swap of data stored at the first PBA candidate and a background swap of data stored at the second PBA candidate.

9. The system of claim 8, wherein at least one of the first function or the second function comprises a function performed by at least one of a multi-stage interconnection network or a block cipher.

10. A method for wear leveling in a non-volatile memory system, the method comprising:
storing information in a first non-volatile memory;
storing a plurality of cumulative control states, each indicative of a state of random mappings between physical block addresses (PBAs) and logical block addresses (LBAs) of the first non-volatile memory, and a plurality of control states in a second non-volatile memory;
translating LBAs to PBAs based on the plurality of cumulative control states;
swapping PBAs assigned to LBAs based on the plurality of control states; and
advancing sequentially through the plurality of cumulative control states and the plurality of control states.

11. The method of claim 10, wherein the storing the plurality of cumulative control states and the plurality of control states comprises:
calculating the plurality of cumulative control states and the plurality of control states; and
storing the plurality of cumulative control states and the plurality of control states.

12. The method of claim 10, wherein the second non-volatile memory comprises a read only memory (ROM).

13. The method of claim 10:
wherein the cumulative control state comprises a first cumulative control state and a second cumulative control state;
wherein the control state comprises a first control state and a second control state; and
wherein the second cumulative control state is a function of the first cumulative control state and the second control state.

14. The method of claim 13, wherein the second cumulative control state comprises switch settings used to achieve a sort of a permutation of the first cumulative control state where the permutation is generated using the second control state.

15. The method of claim 10, further comprising:
changing from a first memory map to a second memory map after swapping a preselected number of PBAs;
wherein the first memory map and the second memory map each comprises a preselected number of PBAs.

16. The method of claim 10, wherein the swapping PBAs assigned to LBAs based on the control state comprises swapping PBAs after a preselected number of accesses of the first non-volatile memory.

17. The method of claim 16, wherein preselected number of accesses comprises 100 writes of the first non-volatile memory.

18. The method of claim 10, further comprising:
generating a first PBA candidate from a LBA using a first function;
generating a second PBA candidate from the LBA using a second function; and
selecting either the first PBA candidate or the second PBA candidate for data access based on information related to a background swap of data stored at the first PBA candidate and a background swap of data stored at the second PBA candidate.

19. The method of claim 18, wherein at least one of the first function or the second function comprises a function performed by at least one of a multi-stage interconnection network or a block cipher.

20. A non-volatile memory system configured for wear leveling, the system comprising:
a first non-volatile means for storing information;
a second non-volatile means for storing a plurality of cumulative control states, each indicative of a state of random mappings between physical block addresses (PBAs) and logical block addresses (LBAs) of the first non-volatile means, and a plurality of control states;
means for translating LBAs to PBAs based on the plurality of cumulative control states;
means for swapping PBAs assigned to LBAs based on the plurality of control states; and
means for advancing sequentially through the plurality of cumulative control states and the plurality of control states.

21. The system of claim 20:
wherein the cumulative control state comprises a first cumulative control state and a second cumulative control state;
wherein the control state comprises a first control state and a second control state; and
wherein the second cumulative control state is a function of the first cumulative control state and the second control state.

22. The system of claim 21, wherein the second cumulative control state comprises switch settings used to achieve a sort of a permutation of the first cumulative control state where the permutation is generated using the second control state.

23. The system of claim 20, further comprising:
means for changing from a first memory map to a second memory map after swapping a preselected number of PBAs;
wherein the first memory map and the second memory map each comprises a preselected number of PBAs.

24. The system of claim 20, wherein the means for swapping PBAs assigned to LBAs based on the control state comprises means for swapping PBAs after a preselected number of accesses of the first non-volatile means.

25. The system of claim 24, wherein the preselected number of accesses comprises 100 writes of the first non-volatile means.

26. The system of claim 20, further comprising:
means for generating a first PBA candidate from a LBA using a first function;
means for generating a second PBA candidate from the LBA using a second function; and
means for selecting either the first PBA candidate or the second PBA candidate for data access based on information related to a background swap of data stored at the first PBA candidate and a background swap of data stored at the second PBA candidate.

* * * * *